United States Patent
Nemoto et al.

(10) Patent No.: US 8,266,192 B2
(45) Date of Patent: Sep. 11, 2012

(54) FILE-SHARING SYSTEM AND METHOD FOR PROCESSING FILES, AND PROGRAM

(75) Inventors: Jun Nemoto, Yokohama (JP); Masakuni Agetsuma, Yokohama (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 12/681,867

(22) PCT Filed: Mar. 19, 2010

(86) PCT No.: PCT/JP2010/001981
§ 371 (c)(1),
(2), (4) Date: Apr. 6, 2010

(87) PCT Pub. No.: WO2011/114382
PCT Pub. Date: Sep. 22, 2011

(65) Prior Publication Data
US 2012/0005193 A1    Jan. 5, 2012

(51) Int. Cl.
*G06F 17/30* (2006.01)
(52) U.S. Cl. ......... 707/821; 707/822; 707/825; 707/831
(58) Field of Classification Search .......... 707/641, 707/694, 741, 821, 822, 825, 831; 709/223, 709/226
See application file for complete search history.

(56) References Cited

U.S. PATENT DOCUMENTS

| | | | |
|---|---|---|---|
| 7,672,981 B1 | 3/2010 | Faibish et al. | |
| 7,689,032 B2* | 3/2010 | Strassenburg-Kleciak | 382/154 |
| 2003/0182253 A1* | 9/2003 | Chen et al. | 707/1 |
| 2003/0195942 A1* | 10/2003 | Muhlestein et al. | 709/215 |
| 2005/0114297 A1* | 5/2005 | Edwards | 707/1 |
| 2005/0149749 A1 | 7/2005 | Van Brabant | |
| 2006/0080353 A1* | 4/2006 | Miloushev et al. | 707/102 |
| 2008/0155214 A1* | 6/2008 | Shitomi | 711/162 |
| 2008/0281950 A1* | 11/2008 | Wald et al. | 709/223 |
| 2008/0281967 A1* | 11/2008 | Muhlestein et al. | 709/226 |
| 2009/0030957 A1 | 1/2009 | Manjunath | |
| 2009/0063556 A1 | 3/2009 | Nemoto et al. | |
| 2009/0276771 A1* | 11/2009 | Nickolov et al. | 717/177 |
| 2010/0070474 A1* | 3/2010 | Lad | 707/624 |
| 2011/0106862 A1* | 5/2011 | Mamidi et al. | 707/823 |
| 2011/0106863 A1* | 5/2011 | Mamidi et al. | 707/823 |
| 2011/0153697 A1* | 6/2011 | Nickolov et al. | 707/827 |

FOREIGN PATENT DOCUMENTS

JP    2009059201 A1    3/2009

* cited by examiner

*Primary Examiner* — Hanh Thai
(74) *Attorney, Agent, or Firm* — Volpe and Koenig, P.C.

(57) ABSTRACT

Provided is a technique capable of efficiently operating files and directories that are stored in storage located in a physically far place from a file server, without causing a network latency. An index creation program is also loaded in a cloud computing environment, and a flag, which indicates whether or not to execute batch processing to a directory that has been migrated to the cloud side, is provided, whereby it becomes possible to collectively execute index creation processing for the migrated directory on the cloud side. More specifically, upon completion of migration of all files under a given directory to the cloud side, a flag, which indicates whether or not to perform batch processing on the cloud side, is validated for the metadata of the directory. Such a batch processing flag can be held for each application such as applications of the index creation processing and the virus check processing.

9 Claims, 21 Drawing Sheets

FIG. 7

Tier Management Table 700

| Mount Path | FSID | Tier Level | Connection Destination Information |
|---|---|---|---|
| /EXPORT | 0x01 | 0x00 | — |
| /Tier1 | 0x01 | 0x0F | — |
| /Tier2 | 0x02 | 0x11 | — |
| /Tier3 | 0x03 | 0x20 | 192.168.1.10 |

Object Management Table 800

| Object Name | Pseudo-FS Object ID | FSID | Real FS Object ID | Counter | Batch Processing Flag |
|---|---|---|---|---|---|
| FILE1 | 0x0001 | 0x01 | 0x12345 | — | — |
| /DIR/FILE2 | 0x0002 | 0x02 | 0x12346 | — | — |
| /DIR/FILE3 | 0x0003 | 0x03 | 0x22222 | — | — |
| /DIR2 | 0x0004 | 0x01 | 0x12347 | 0 | 0x0003 |
| /DIR2/FILE1 | 0x0005 | 0x03 | 0x33333 | — | — |
| /DIR2/FILE2 | 0x0006 | 0x03 | 0x44444 | — | — |

810 820 830 840 850 860

870 — FILE1 row
871 — /DIR/FILE3 row
872 — /DIR2 row
873 — /DIR2/FILE1 row

FILE-SHARING SYSTEM AND METHOD FOR PROCESSING FILES, AND PROGRAM

TECHNICAL FIELD

The present invention relates to a file-sharing system and a method for processing files, and a program. In particular, the invention relates to a technique for providing a service via a file server.

BACKGROUND ART

Storage systems with a variety of performance levels have been developed. Volumes that constitute storage systems come in a variety of performance levels. Typically, volumes with high performance are expensive and have a low storage capacity, whereas volumes with low performance are inexpensive and have a high storage capacity.

There is known a data management method called an HSM (Hierarchical Storage Management) function that optimally arranges files through the use of a plurality of such volumes with different properties, with a view to reducing the cost of storage systems. With the HSM function, files which are frequently used are migrated to a "high-speed, expensive" volume, whereas files which are less frequently used are migrated to a "low-speed, inexpensive" volume (drive). Further, the HSM function makes such file migration transparent to clients. Controlling the volumes for storing files in this manner with the HSM function allows a reduction in the cost of the storage.

As a migration destination of a file, it is also possible to use another file server. Migrating a file to a file server with a "lower-speed, less expensive" volume allows construction of a more layered hierarchical structure and a further reduction in the cost. For example, Patent Literature 1 discloses a method of using another file server as a file migration destination. According to Patent Literature 1, after a file is migrated from a given file server to another file server, it is determined, upon request for access to the file, if the file is a stub file. If the file is determined to be a stub file, the request is transferred to the migration-destination file server to perform the processing.

In recent years, so-called cloud computing, with which a huge computing environment or storage over a network is used as a pay-as-you-go service via the Internet, or cloud storage (hereinafter also simply referred to as a "cloud") has been spreading. Using such cloud storage as a migration destination of a file is also considered. Various types of storage management such as capacity management or failure management are carried out by vendors that provide cloud storage. Thus, it is expected that management cost be reduced by migrating files to such cloud storage.

CITATION LIST

Patent Literature

PTL 1: JP Patent Publication (Kokai) No. 2009-59201 A

SUMMARY OF INVENTION

Technical Problem

However, when the file access method disclosed in Patent Literature 1 is applied to files that have been migrated from a given file server to a place (e.g., a cloud computing environment or cloud storage) that is physically far from the file server, a network latency problem could arise. For example, when indexes used by search engines are to be created, it would be necessary to access all files in a migrated directory tree point by point, which could increase the number of file accesses. This, in turn, could result in increased processing time as the files to be accessed reside in a network with a large latency. Processing time could similarly increase not only when indexes are created, but also when a program that scans the entire directory tree (e.g., a virus check program) is executed.

The present invention has been made in view of the foregoing circumstances, and provides a technique that is capable of, even when a cloud computing environment with a large network latency is used as a file migration destination of an HSM function, efficiently operating files and directories that are stored in storage located in a physically far place from a file server, without causing a network latency.

Solution to Problem (1) In order to solve the aforementioned problem, the present invention makes it possible to collectively execute, to files that have been migrated to a cloud computing environment (i.e., files under a directory tree), index creation processing or virus check processing on the cloud side. Transferring only the result of such processing allows a reduction in the processing time.

Specifically, upon completion of migration of all files under a given directory to the cloud side, a flag, which indicates whether or not to perform batch processing on the cloud side, is validated for the metadata of the directory. Such a batch processing flag can be held for each application such as applications of the index creation processing and the virus check processing.

An index creation program, for example, creates indexes by scanning the entire directory tree. When the object to be scanned is a directory, the index creation program checks if the batch processing is valid. If the batch processing is determined to be valid, the index creation program issues an index create request to another index creation program that has been preloaded in the cloud computing environment. Such an index create request includes a list of the identifiers of files under the target directory to be scanned.

The index creation program on the cloud computing environment, in response to the request received, creates indexes for the target files, and sends the result to the index creation program on the file server.

Finally, the index creation program on the file server maps the obtained result into a name space of its own file server so that all of the processing appears to a user as if it has been performed on the file server side.

(2) That is, a file-sharing system in accordance with the present invention includes a first file server (200, 1800) that includes a first scan processing section (290, 1810) configured to scan data included in a file to generate predetermined information, the first file server (200, 1800) being configured to provide a file to a client terminal (100) based on a virtual file system (360) that is generated by virtually merging a first file system (370, 380) and a second file system (490); and a second file server (400, 1900) that includes a second scan processing section (460, 1910) and the second file system (490), the second scan processing section (460, 1910) being configured to scan data included in a file to generate predetermined information.

The first scan processing section (290, 1810), in response to a first scan processing request for files included in the first and second file systems (370, 380, 490) issued by a management terminal (110), executes scan processing to the files included in the first file system (370, 380) based on the virtual file system (360), and sends a second scan processing request to the second file server (400, 1900) to execute scan processing to the files included in the second file system (490).

The second scan processing section (460, 1910), in response to the second scan processing request received, executes scan processing to the target files and sends the scan processing result to the first file server (200, 1800).

The first file server (200, 1800) merges the scan processing result obtained with the first scan processing section (290, 1810) and the scan processing result obtained with the second scan processing section (460, 1910), and provides the merged result to the management terminal (110). Herein, examples of the scan processing executed by the first and second scan processing sections (290, 460, 1810, 1910) include index creation processing for creating index information to be used for search engines by extracting a keyword from a file, and virus check processing for checking for viruses by scanning a file.

(3) The virtual file system (360) constitutes a hierarchical file system with the first file system (370, 380) defined as an upper-level file system and the second file system (490) defined as a lower-level file system.

Further, the first file server (200, 1800) includes a file migration processing section (540) configured to migrate a file from the first file system (370, 380) to the second file system (490) in accordance with predetermined conditions (an inter-tier migration policy 550).

Further, the first file server (200, 1800) includes an object management table (800) that manages a correspondence relationship between the virtual file system (360) and a storage location of a real file or directory, and a batch processing flag (860) indicating that all files included in a single directory have been migrated to the second file system (490). In such a case, the first scan processing section (290, 1810) refers to the object management table (800) for a file and a directory corresponding to the first scan processing request, and sends the second scan processing request to the second file server (400, 1900) to execute scan processing to all files included in a directory whose batch processing flag (860) is ON. Then, the second scan processing section (460, 1910), in response to the second scan processing request received, executes scan processing to the target files and sends the scan processing result to the first file server (200, 1800).

Meanwhile, the first scan processing section (290, 1810) executes by itself scan processing to files that are included in a directory whose batch processing flag (860) is OFF and are included in the second file system (490), instead of instructing the second scan processing section (460, 1910) to execute scan processing to such files.

The first file sever (200, 1800) may be configured to monitor the state of communication with the second file server (400, 1900), and to change, when the amount of network delay indicated by the communication state exceeds a threshold concerning the network delay and the batch processing flag (860) in the object management table (800) is OFF, the batch processing flag (860) to ON.

(4) The first and second scan processing sections (290, 490, 1810, 1910) may be implemented as programs loaded in memory. In such a case, the first file server (200, 1800) instructs the second file server (400, 1900) to load and unload the program for implementing the second scan processing section (460, 1910) into/from memory (440) on the second file server (400, 1900) at any given time.

(5) When the file-sharing system further includes a third file server that is connected to the first file server (200, 1800) and provides a third file system, the first file server (200, 1800) checks if the third file server has a third scan processing section corresponding to the second scan processing section (460, 1910), and determines, based on the check result, which of the first scan processing section (290, 1810) of the first file server (200, 1800) and the third scan processing section is to execute scan processing to one or more objects provided by the third file system.

Further features of the present invention will become apparent from the following best mode for carrying out the invention and the accompanying drawings.

Advantageous Effects of Invention

According to the present invention, files and directories that are stored in storage located in a physically far place from a file server can be efficiently operated without causing a network latency.

BRIEF DESCRIPTION OF DRAWINGS

FIG. 7 shows the internal structure of a tier management table in accordance with the first embodiment.

FIG. 8 shows the internal structure of an object management table in accordance with the first embodiment.

DESCRIPTION OF EMBODIMENTS

Figure 1:
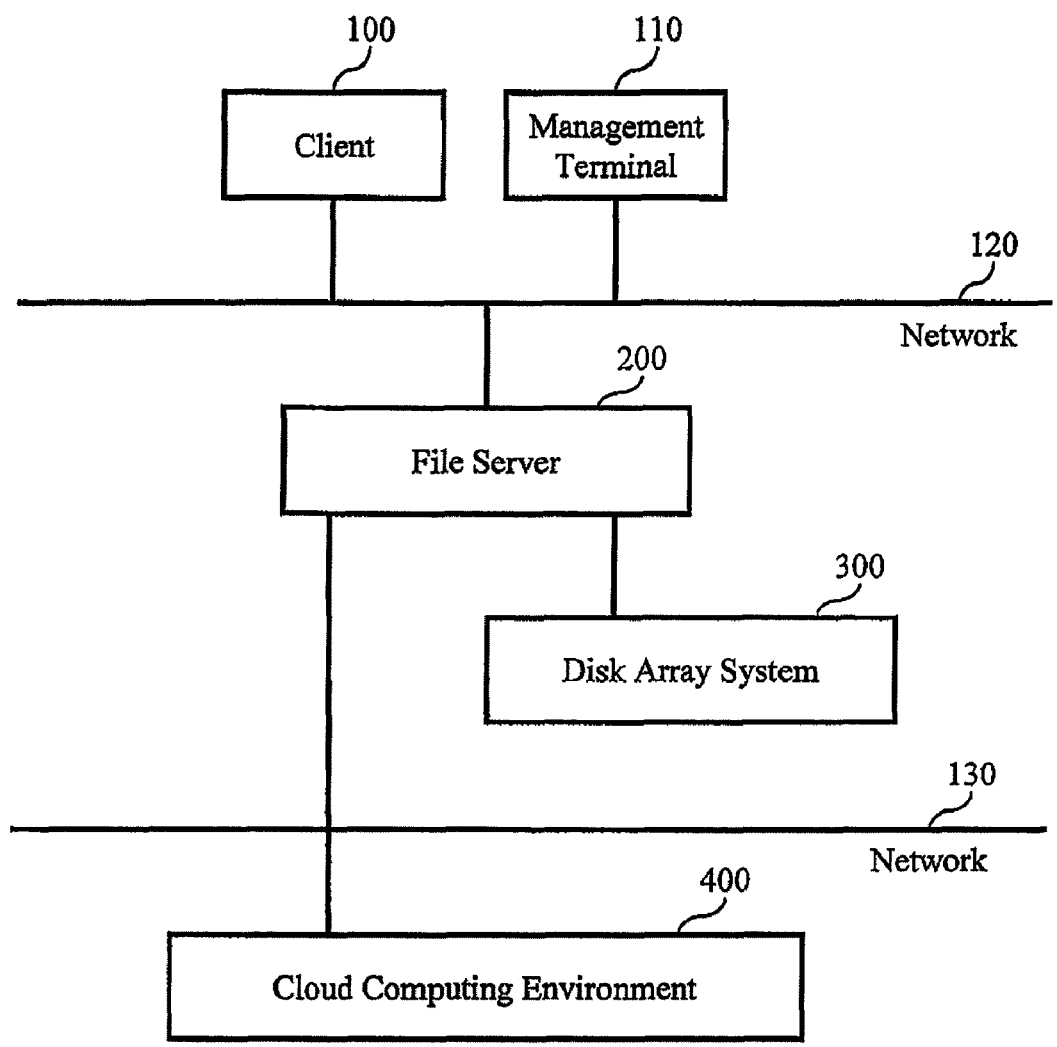
FIG. 1 shows an exemplary configuration of a file-sharing system in accordance with the first embodiment.

According to the present invention, when providing a file search service or a virus check service for a file server that optimally arranges files in accordance with the properties of file systems, an application that scans a directory tree that has been migrated to a cloud computing environment is executed at fast speed. Accordingly, even when a cloud computing environment with a large network latency is used as a file migration destination of an HSM function, an application that scans a directory tree on the cloud side can be executed at fast speed.

Hereinafter, the present invention will be described by way of examples in which index creation processing and virus checking are executed to a directory tree that has been migrated from a given file server to a cloud computing environment with a large network latency via an HSM function. It should be noted that the present embodiment is only illustrative for implementing the present invention and thus is not to be construed as limiting the technical scope of the present invention. Structures that are common throughout the drawings will be assigned the same reference numerals.

Embodiment 1

<Configuration of File-Sharing System>

FIG. 1 is a block diagram showing the schematic configuration of a file-sharing system in accordance with the present invention. The file-sharing system includes a client (one or more terminals) 100, at least one management terminal 110, at least one file server 200 connected to the client 100 and the management terminal 110 via a network 120, a disk array system 300 locally connected to the file server 200, and at least one cloud computing environment 400 connected to the file server 200 via a network 130.

The client 100 is a computer that is used by a user who uses a file-sharing service provided by the file server 200.

The management terminal 110 is a computer that manages the file server 200 and is used by a system administrator who manages the file server 200.

The file server 200 is a computer that provides a file-sharing service to the client 100. The file server 200 has an HSM function. Thus, it is also a file server that secondarily provides a file-sharing service provided by the cloud computing environment 400 to the client 100 by communicating with the cloud computing environment 400 via the HSM function.

The cloud computing environment 400 is a computer that provides a file-sharing service used by the file server 200 and an environment for executing various applications. That is, the present invention is based on the premise that the cloud computing environment 400 not only has a mere storage function but executes various operations.

The network 120 is a network that mutually connects the client 100, the management terminal 110, and the file server 200. The network 120 is a LAN (Local Area Network), for example.

The network 130 is a network that mutually connects the file server 200 and the cloud computing environment 400. The network 130 is a WAN (Wide Area Network) or the Internet, for example.

The disk array system 300 is a storage system for storing data that is read or written by the client 100 via the file server 200. The disk array system 300 and the file server 200 can be connected either directly or via a SAN (Storage Area Network). Alternatively, the file server 200 may incorporate therein a storage unit that corresponds to the disk array system 300.

<Configuration of File Server>

Figure 2:
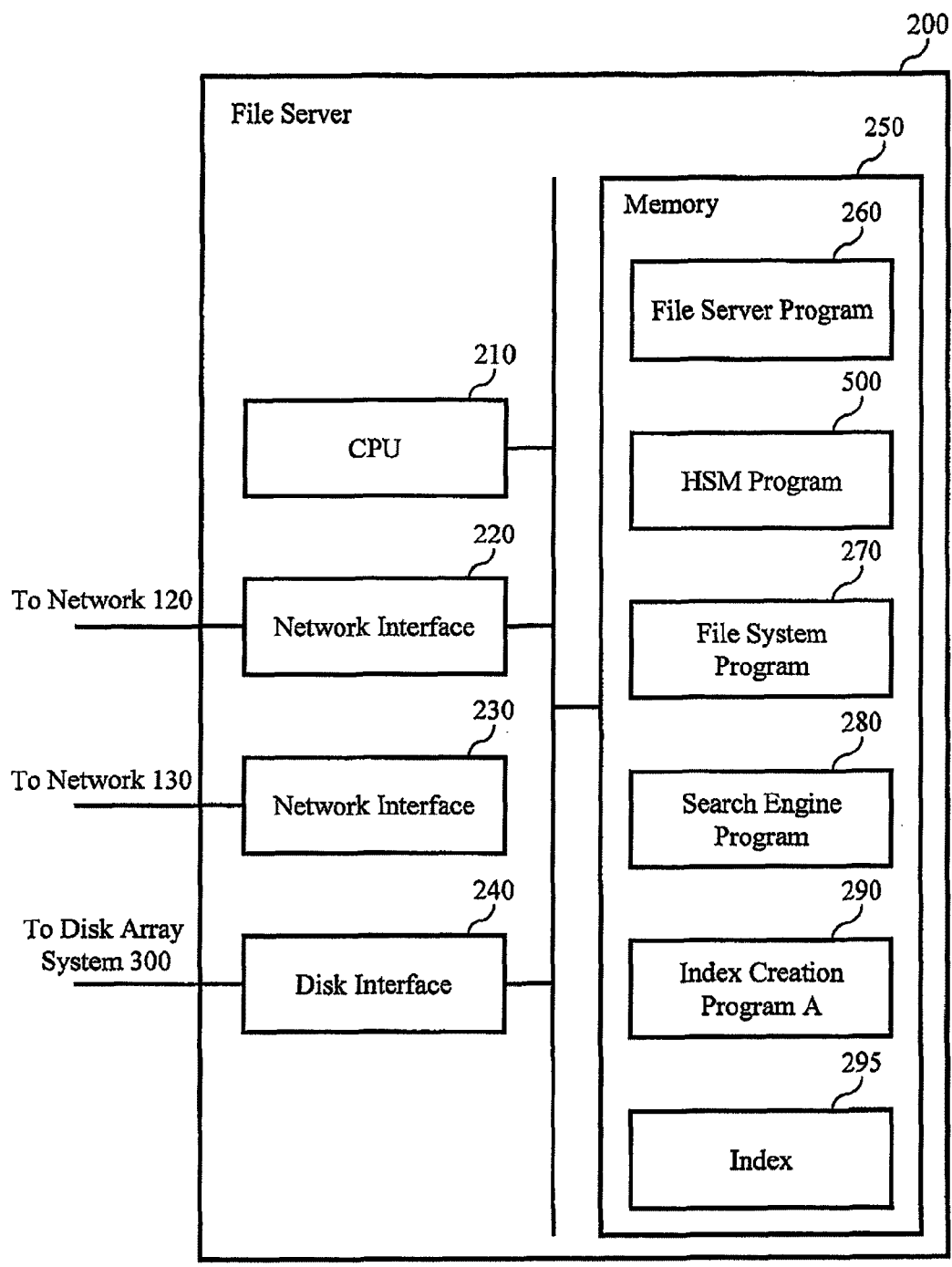
FIG. 2 shows the internal configuration of a file server in accordance with the first embodiment.

FIG. 2 is a block diagram showing the schematic configuration of the file server 200. As shown in FIG. 2, the file server 200 is a computer including a CPU 210 that executes programs stored in memory 250, a network interface 220 used to communicate with the client 100, a network interface 230 used to communicate with the cloud computing environment 400, a disk interface 240 used to communicate with the disk array system 300, and the memory 250 for storing programs and data, all of which are connected via an internal communication channel (e.g., a bus).

The memory 250 of the file server 200 has stored therein programs and data. For example, a file server program 260, an HSM program 500, a file system program 270, a search engine program 280, an index creation program A 290, an index 295, and the like are stored.

The file server program 260 is a program (e.g., an NFS server program) that provides a file-sharing service to the client 100 in response to an input/output request (an I/O request) from the client 100.

The HSM program 500 constructs a pseudo-file system (e.g., a virtual file system) 360 with a real file system A 370 and a real file system B 380 that are managed by the file system program 270 and with a real file system C 490 that is managed by a file system program 470 in the cloud computing environment 400. This HSM program 500 is a program that provides an HSM function of migrating files between the real file system A 370, the real file system B 380, and the real file system C 470 in a manner transparent to the client 100 in accordance with the utilization situation of the files and the like. Accordingly, even when migration of a real file has occurred, such a file can be provided to the client 100 only by the access to the file server 200 from the client 100 as the storage location of the real file is managed by the pseudo-file system 360.

The file system program 270 is a program that manages the real file system A 370 and the real file system B 380 stored in the disk array system 300.

The search engine program 280 is a program that provides a service of searching a file, which is requested by a user, from a number of files in the file server 200.

The index creation program A 290 is a program used by the search engine program 280 and creates an index to be used for accurately searching for a file requested by a user at fast speed. The index creation program A 290 operates in conjunction with an index creation program B 460.

The index 295 is index data created by the index creation program A 290. Such index data is obtained by, for example, periodically copying index data from the index 295 in the disk array system 300 and storing it into the memory. The index 295 is used for the search engine program 280 to search for a file requested by a user.

<Configuration of Disk Array System>

Figure 3:
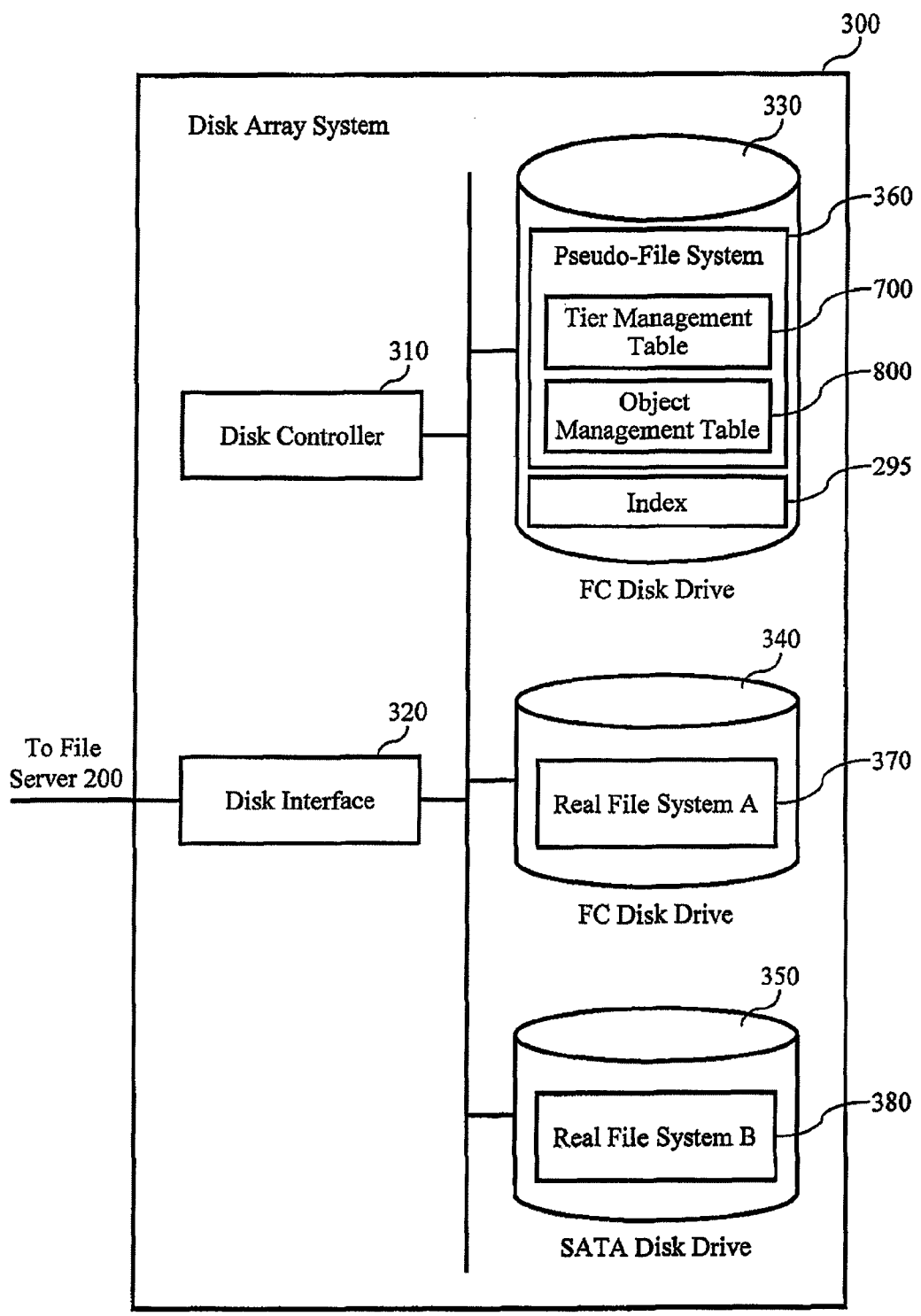
FIG. 3 shows the internal configuration of a disk array system used by a file server in accordance with the first embodiment.

FIG. 3 is a block diagram showing the schematic configuration of the disk array system 300. As shown in FIG. 3, the disk array system 300 includes a disk controller 310, a disk interface 320, FC (Fibre Channel) disk drives 330 and 340, and a SATA (Serial Advanced Technology Attachment) disk drive 350.

The disk controller 310, in response to an input/output request from the file server 200 obtained via the disk interface 320, inputs and outputs data into/from the FC disk drives 330 and 340 and the SATA disk drive 350 per block, for example.

The disk interface 320 is an interface used to communicate with the file server 200.

The FC disk drives 330 and 340 and the SATA disk drive 350 are disk drives for storing data that is read or written by the file server 200. The FC disk drive 330 has stored therein the pseudo-file system 360 and the index 295. The FC disk drive 340 has stored therein the real file system A 370. The SATA disk drive 350 has stored therein the real file system B 380.

In order to provide an HSM function, it is acceptable as long as the disk drives for storing the real file system A 370 and the real file system B 380, which together form the pseudo-file system 360, differ in property such as performance, capacity, or price.

Thus, the FC disk drive 340 and the SATA disk drive 350 may be different disk drives. In addition, the FC disk drive 330 need not necessarily be an FC disk drive; it may be a disk drive of a different type such as a SATA disk drive.

The disk drive for storing the pseudo-file system 360 is frequently referred to upon access to the real file system A 370, the real file system B 380, or the real file system C 490 by the client 100. Thus, a high-performance disk drive (e.g., an FC disk drive) is typically used, though any type of disk drives can be used.

<Configuration of Cloud Computing Environment>

Figure 4:
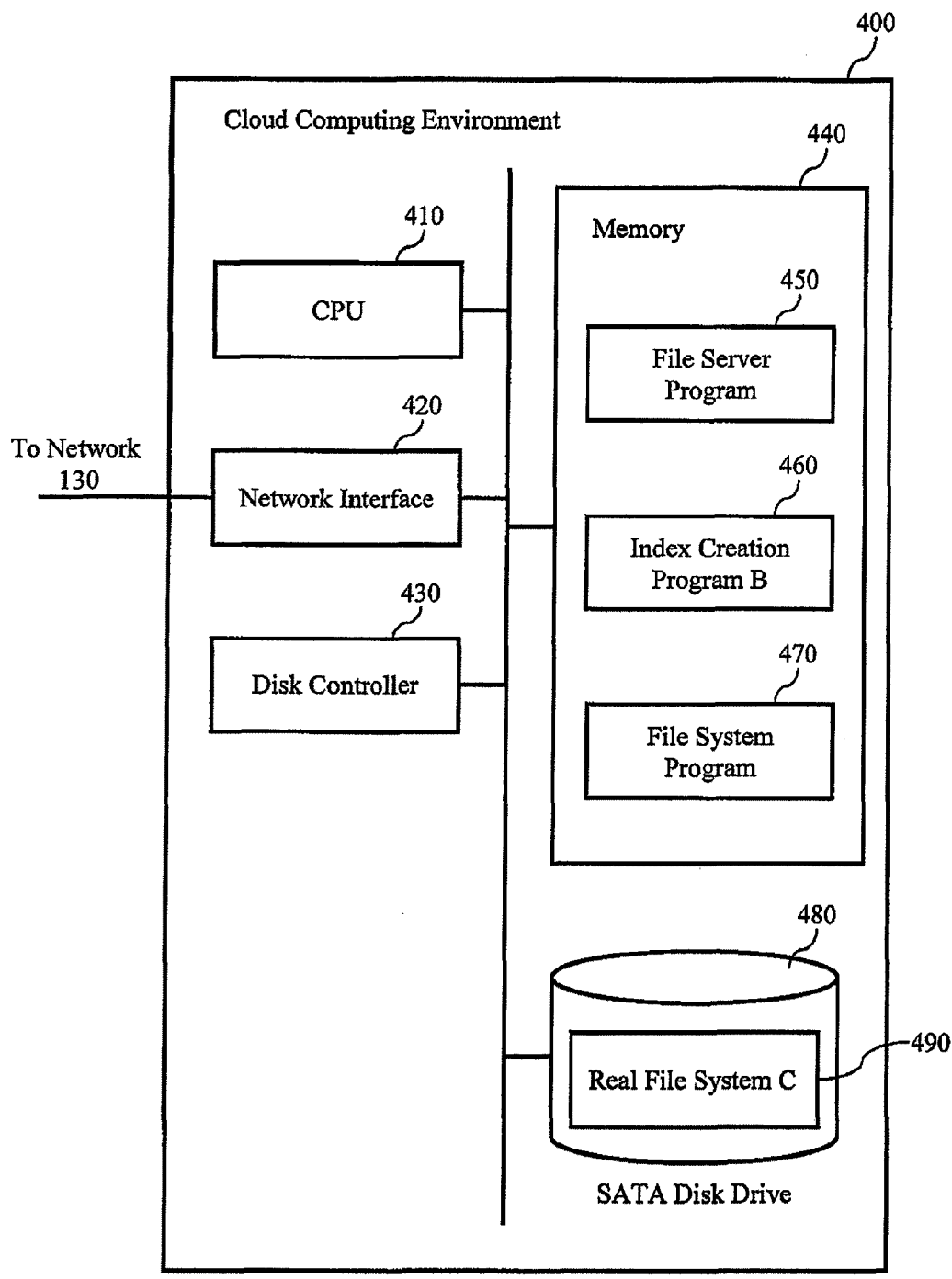
FIG. 4 shows the internal configuration of a cloud computing environment in accordance with the first embodiment.

FIG. 4 is a block diagram showing the schematic configuration of the cloud computing environment 400. As shown in FIG. 4, the cloud computing environment 400 is a computer including a CPU 410 that executes programs stored in memory 440, a network interface 420 used to communicate with the file server 200, a disk controller 430, a SATA disk drive 480, and the memory 440 for storing programs and data, all of which are connected via an internal communication channel (e.g., a bus).

The memory 440 in the cloud computing environment 400 has stored therein programs and data. For example, a file server program 450, a file system program 470, and the like are stored. A user of a cloud computing service loads a given program into the memory 440 in the cloud computing environment 400 so that it can be executed with the CPU 410. In this embodiment, the file server 200 loads the index creation program B 460 into the memory 440.

The file server program 450 is a program (e.g., a WebDAV server program) that provides a file-sharing service to the file server 200.

The index creation program B 460 is a program that operates in conjunction with the index creation program A 290 and creates indexes to be used by the search engine program 280.

The file system program 470 is a program that manages the real file system C 490 stored in the SATA disk drive 480.

The disk controller 430, in response to input/output requests from various programs stored in the memory 440, inputs and outputs data into/from the SATA disk drive 480 per block, for example.

The SATA disk drive 480 is a disk drive for storing data that is read or written by various programs stored in the memory 440. The SATA disk drive 480 has stored therein the real file system C 490.

The disk drive used by the cloud computing environment 400 may be directly connected as exemplified by the SATA disk drive 480. Alternatively, it may be connected to the disk drive on the disk array system, which is connected to the SAN, via the disk interface.

The disk drive used by the cloud computing environment 400 need not necessarily be a SATA disk drive; it may be a disk drive of a different type such as an FC disk drive.

<Functional Structure of HSM Program>

Figure 5:
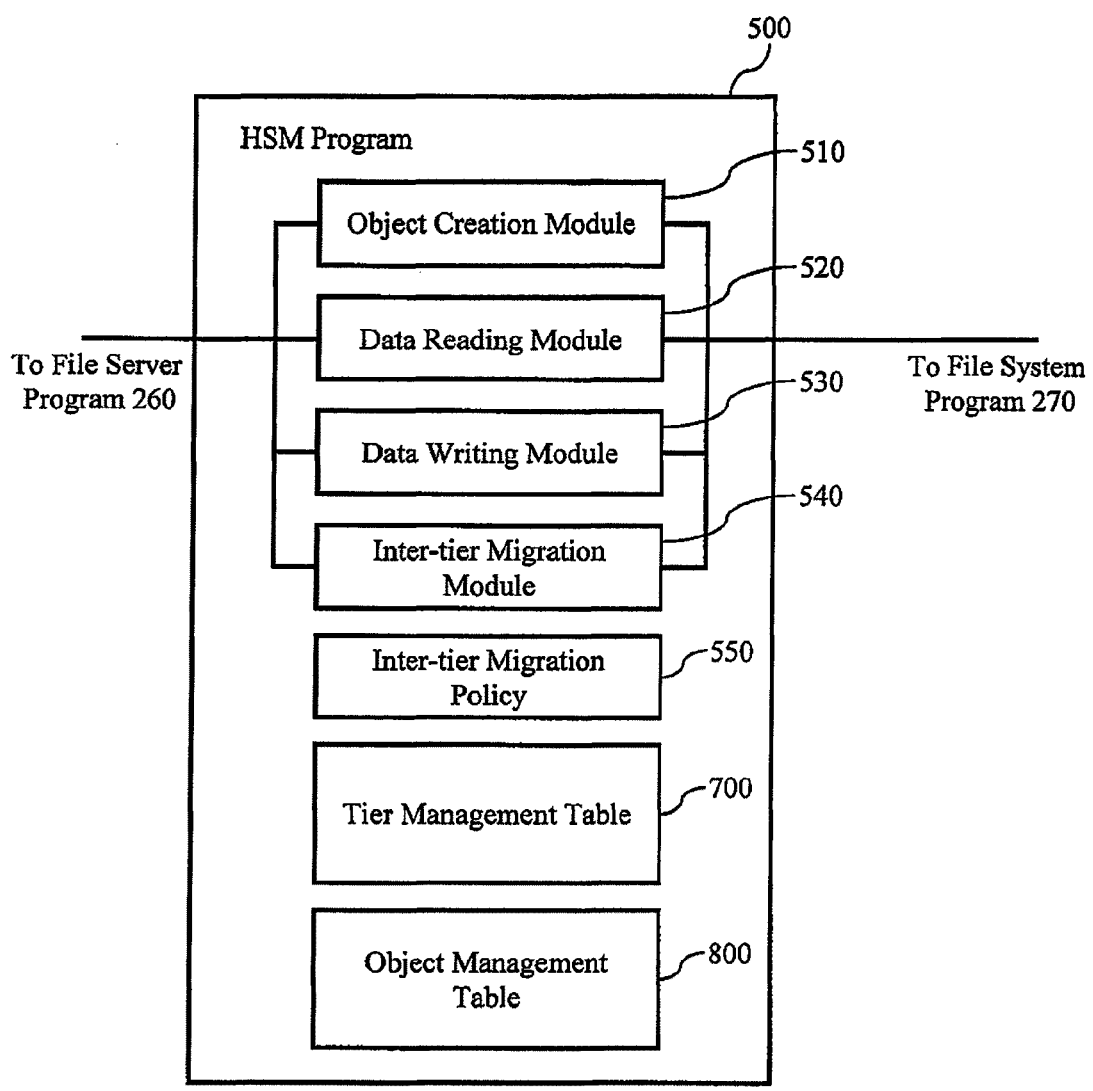
FIG. 5 shows the internal structure of an HSM program in accordance with the first embodiment.

FIG. 5 is a block diagram showing the functional structure of the HSM program 500. As shown in FIG. 5, the HSM program 500 includes an object creation module 510, a data reading module 520, a data writing module 530, an inter-tier migration module 540, an inter-tier migration policy 550, a tier management table 700, and an object management table 800.

The object creation module 510 is executed by the CPU 210 of the file server 200 upon receipt of a file create request or a directory create request from the client 100 via the file server program 260. The object creation module 510 adds an entry to the object management table 800, and creates an object (a file and a directory) in the file server 200.

The data reading module 520 is executed by the CPU 210 of the file server 200 upon receipt of a data read request from the client 100 via the file server program 260. The data reading module 520 refers to the object management table 800, and reads, after identifying a real file system in which the requested file resides, data from the relevant file. If the real file system in which the requested file resides is the real file system in the cloud computing environment 400, the data reading module 520 sends a data read request to the cloud computing environment 400.

The data writing module 530 is executed by the CPU 210 of the file server 200 upon receipt of a data write request from the client 100 via the file server program 260. The data writing module 530 refers to the object management table 800, and writes, after identifying a real file system in which the requested file resides, data to the relevant file. If the real file system in which the requested file resides is the real file system in the cloud computing environment 400, the data writing module 530 sends a data write request to the cloud computing environment 400.

The inter-tier migration module 540 is executed by the CPU 210 of the file server 200 in accordance with administrator's instructions or a prespecified schedule (e.g., once a day). The inter-tier migration module 540 migrates files between file systems of different tier levels based on the conditions specified by the inter-tier migration policy 550.

The inter-tier migration policy 550 is a policy for migrating files between file systems of different tier levels. In this embodiment, files are migrated between file systems of three tier levels: the real file system A 370, the real file system B 380, and the real file system C 490. The inter-tier migration policy 550 is set by combining pieces of attribute information such as the file creation time, the last update time, the last access time, and the file size. The inter-tier migration policy 550 is a policy which provides, for example, that "a file that was created one month or more ago and resides in a first-level file system shall be migrated to a second-level file system." The inter-tier migration policy 550 is designated by an administrator in advance in accordance with the performance, reliability, and cost of the disk drives that constitute the real file system A 370 and the real file system B 380. When the cloud computing environment 400 includes a real file system like the real file system C 490 and a file therein is accessed via the file server program 450, an administrator designates the inter-tier migration policy 550 in accordance with the performance, reliability, and cost of the file server program 450 using the management terminal 110.

It should be noted that examples of disk drives that have high performance and high reliability and are expensive include FC disk drives. Meanwhile, disk drives that have lower performance and lower reliability and are less expensive than FC disk drives include SATA disk drives. It is also possible to construct the first-level file system and the second-level file system with RAID 1 and RAID 5, respectively, in accordance with the intended use so that the performance, reliability, and cost of each disk drive can be differentiated.

It is also possible to provide two tier levels of file systems: one real file system on the file server 200 and one real file system in the cloud computing environment 400. Alternatively, it is also possible to provide four or more tier levels of file systems which include at least one real file system in the cloud computing environment 400.

The tier management table 700 is a table for managing the real file systems that constitute the pseudo-file system 360.

The object management table 800 is a table for correlating an object (a file and a directory) of the pseudo-file system 360 with an object (a file and a directory) of the real file system.

Though not shown in FIG. 5, the HSM program 500 also has a module for processing other requests received by the file server program 260 such as an object delete request or a directory read request.

<Exemplary Tree Structure of File System>

Figure 6:
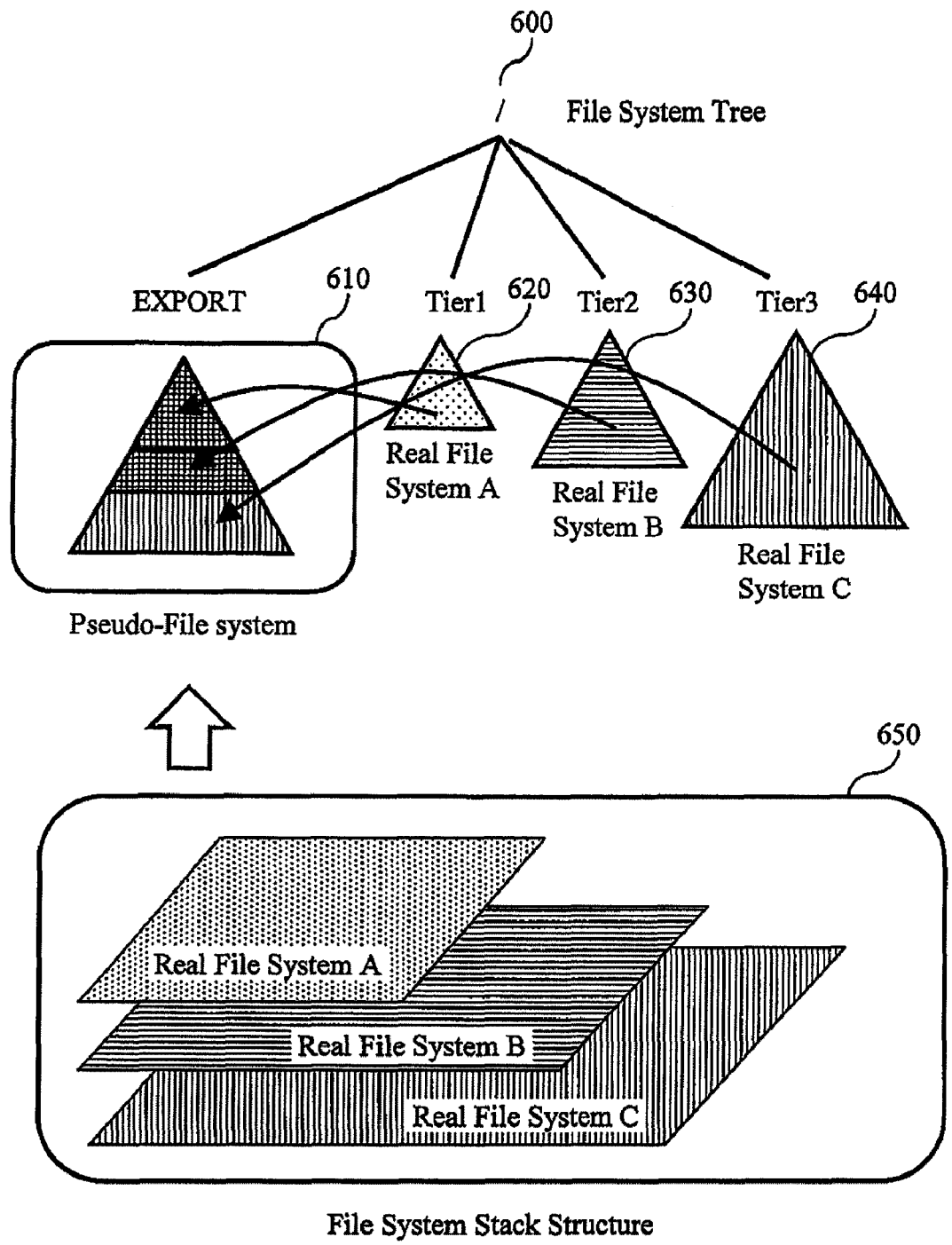
FIG. 6 shows the structure of a file system tree that provides an HSM function in accordance with the first embodiment.

FIG. 6 is a schematic diagram showing an exemplary structure of a file system tree 600 when an HSM function is used in this embodiment. The file system tree 600 is a name space of a file system that is constructed by the file server 200 and is provided to the client 100.

The file system tree 600 is composed of a /(root) directory and subsequent directories under the root, which include an EXPORT directory, a Tier 1 directory, a Tier 2 directory, and a Tier 3 directory. The real file system A 370 is mounted on the Tier 1 directory as the first-level file system. The real file system B 380 is mounted on the Tier 2 directory as the second-level file system. The real file system C 490 is mounted on the Tier 3 directory as the third-level file system. According to the HSM function of this embodiment, the Tier 1 directory, the Tier 2 directory, and the Tier 3 directory are laid over the EXPORT directory. At this time, the pseudo-file system 360 is formed by disposing the real file system A 370 at the uppermost level, the real file system B 380 at the intermediate level, and the real file system C 490 at the lowermost level as shown by a file system stack structure 650. The file server program 260 exports and provides directories under the EXPORT directory to the client 100.

<Example of Tier Management Table>

FIG. 7 shows an exemplary structure of the tier management table 700. The tier management table 700 is a table that includes, as a single entry, a set of a mount path 710 that indicates the mounted position of a real file system (e.g., the real file system A 370, the real file system B 380, or the real file system C 490), FSID 720 that indicates the management ID of the file system, tier level 730 that indicates the tier level of the file system, and connection destination information 740.

The connection destination information 740 is information for establishing, when the real file system resides in another file server or in the cloud computing environment, a connection to such a file server or cloud computing environment. Examples of the connection destination information 740 includes IP address. The connection destination information 740 may include, in addition to the IP address, information indicating the characteristics of the file server or the cloud computing environment as the connection target (e.g., whether there is an environment in which applications can be executed) and information that can, when there are a plurality of real file systems within the connection target, identify such a plurality of real file systems.

It should be noted that the upper and lower levels of the hierarchy 730 are specified by an administrator using the management terminal 110 in starting the operation of the HSM system. For example, in order to construct the pseudo-file system 360, an administrator specifies and registers the real file system A 370 constructed from the FC disk drive as the upper-level file system, specifies and registers the real file system B 380 constructed from the SATA disk drive as the intermediate-level file system, and specifies and registers the real file system C 490 in the cloud computing environment 400 as the lower-level file system. Though such registration operations, an entry is added to the tier management table 700. FIG. 7 shows an example in which a tier level 0x0F represents the first level, a tier level 0x11 represents the second level, and a tier level 0x20 represents the third level. The numeral values representing hierarchies can be any values as long as such values help distinguish the hierarchical order of the upper and lower levels. If the values are specified with intervals therebetween as shown in the example of FIG. 7, it becomes also possible to provide a new level between the first level and the second level or between the second level and the third level should the need arise.

<Example of Object Management Table>

FIG. 8 shows an exemplary structure of the object management table 800. The object management table 800 is a table for managing a correspondence relationship. Specifically, this table includes, as a single entry, a set of an object name 810, pseudo-FS object ID 820, FSID 830, real FS object ID 840, counter 850, and batch processing flag 860.

The object name 810 indicates a file name or a directory name of the pseudo-file system 360. The pseudo-FS object ID 820 is the identifier (e.g., inode number) of the file or the directory in the pseudo-file system 360. The FSID 830 is the ID of a real file system in which the file or the directory is actually stored. The real FS object ID 840 is the identifier for uniquely identifying a file or a directory within the real file system. For example, if the real file system is a local file system, the real FS object ID 840 is an inode number, whereas if the real file system is in another file server or in the cloud computing environment, the real FS object ID 840 is an URL or a file handle. The counter 850 indicates the numerical value for counting the number of files or directories that have not been migrated to the cloud computing environment 400, among files or directories under a given directory. For example, an entry 871 represents a state in which all objects under /DIR2 have been migrated to the cloud side, and thus the counter indicates zero and the batch processing flag indicates a valid state. It should be noted that this embodiment employs a method in which directories are not migrated. Thus, /DIR2 itself does not reside in the cloud and the FSID remains unchanged as 0x01. FIG. 8 shows an example of two files (entries 872 and 873) under /DIR2 in such a case.

It should also be noted that a state in which a directory has been migrated to the cloud computing environment 400 means a state in which all objects under the directory have been migrated to the cloud computing environment 400. The batch processing flag 860 is a flag indicating whether or not to collectively index a directory tree that has been migrated to the cloud computing environment 400, using the index creation program B 460 in the cloud computing environment 400. The batch processing flag 860 can also be used to indicate whether or not to perform batch processing for a single application other than the index creation program or for a plurality of applications.

The object management table 800 correlates a single entry with a single file or directory. A user of the client 100 specifies the object name 810 to access a file or a directory. In so doing, the HSM program 500 identifies the entry corresponding to the object name, and performs processing to the entity of the object.

<Example of Index Creation Screen>

Figure 9:
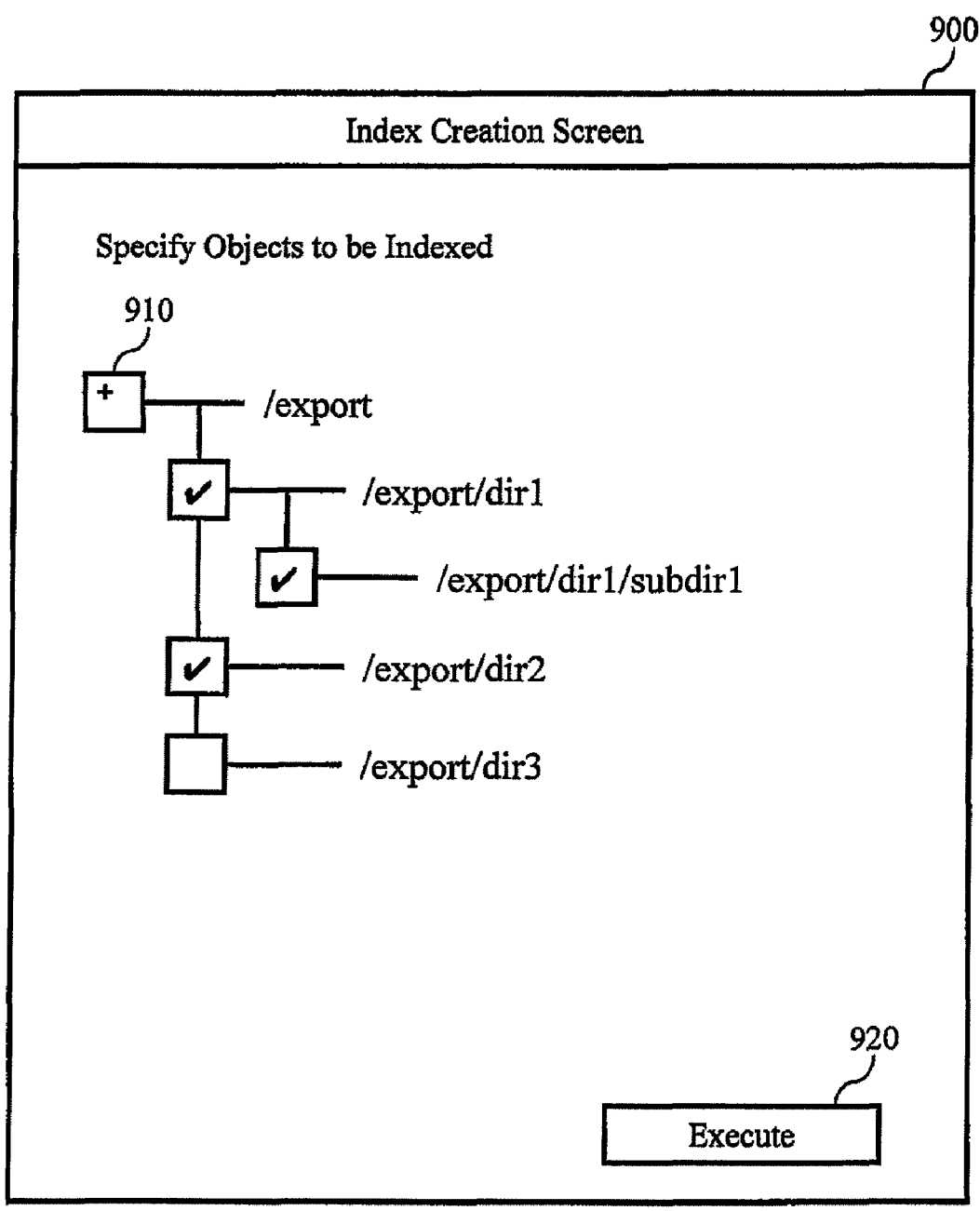
FIG. 9 shows an exemplary index creation screen in accordance with the first embodiment.

FIG. 9 shows an example of an index creation screen 900 displayed on the management terminal 110 by the index creation program A 290 in order for a system administrator to create indexes. The index creation screen 900 includes a check box 910 to non-exclusively select a target directory to be indexed and a button 920 to execute index creation processing.

In the check box 910, a check mark is displayed when all directories under a given directory are selected, and a plus mark is displayed when part of directories under a given directory are selected. For example, in FIG. 9, directories /export/dir1, /export/dir1/subdir1, and /export/dir2 are selected as the objects to be indexed. Thus, check marks are displayed for the directories /export/dir1, /export/dir1/subdir1, and /export/dir2, whereas a plus mark is displayed for the directory /export.

<Contents of Index Creation Processing>

Hereinafter, index creation processing of the system in this embodiment will be described with reference to FIGS. 10 to 17.

(i) Object Creation Processing

Figure 10:
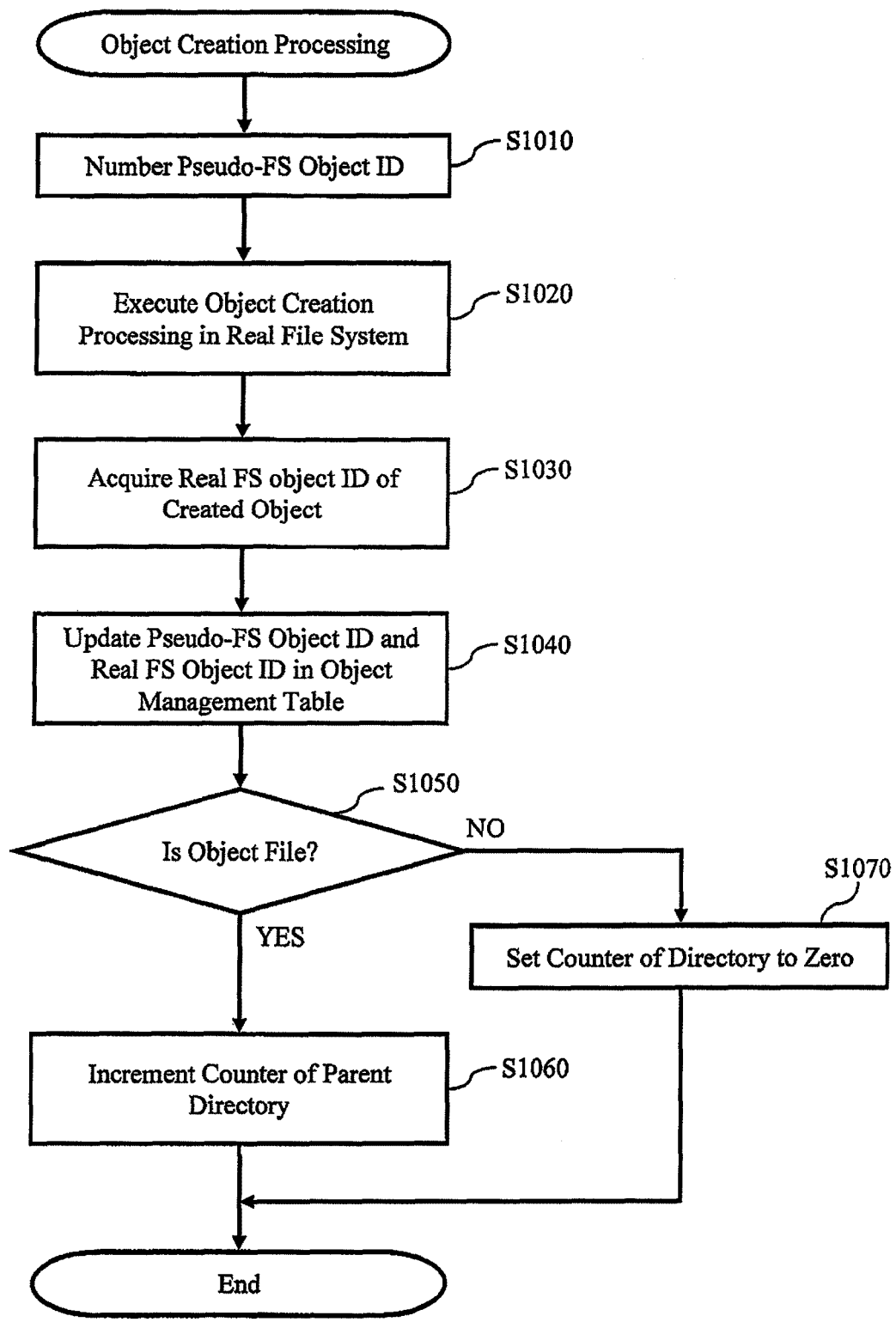
FIG. 10 shows exemplary processing of an object creation module in accordance with the first embodiment.

FIG. 10 is an exemplary flow chart for describing the details of the object creation processing executed by the object creation module 510 (in conjunction with the CPU 210). The object creation module 510 is executed upon receipt of a file create request or a directory create request by the file server program 260. The file create request and the directory create request correspond to, when the file server program 260 is an NFS (Network File System), a create request and a mkdir request, respectively. The object create request includes the name of the object to be created and the type of the object (a file or a directory).

First, the object creation module 510 numbers the pseudo-FS object ID used for the pseudo-file system 360 (S1010). For example, it creates a pseudo-FS object ID (0x0001) entered as a single entry 870 (see FIG. 8).

Next, the object creation module 510 executes object creation processing to the real file system of the uppermost level (in this embodiment, the real file system A370, and the FSID indicates 0x01) (S1020). For example, the object creation module 510 assigns the real FS object ID (0x12345) to FILE 1 in the single entry 870 (FIG. 8).

Then, the object creation module 510 acquires the real FS object ID of the created object from the result of the object creation processing in S1020 (S1030).

Then, the object creation module 510 creates an entry (e.g., the entry 870) in the object management table 800, and saves the name of the specified object (the object name 810), the pseudo-FS object ID 820 numbered in S1010, the ID of the real file system in which the object was created in S1020 (FSID 830), and the real FS object ID 840 acquired in S1030 (S1040).

Next, the object creation module 510 checks if the created object is a file (S1050).

If the created object is determined to be a file (if the answer to S1050 is YES), the object creation module 510 searches the object management table 800 to increment the counter 850 of an entry corresponding to the parent directory by one (S1060), and ends the processing. It should be noted that when the counter 850 of the parent directory is incremented from zero to one, the counter 850 of a parent directory of that parent directory is also incremented by one. Such increment processing is repeated recursively.

If the created object is determined to be a directory (if the answer to S1050 is NO), the object creation module 510 sets the counter of the relevant entry in the object management table 800 to zero (S1070), and ends the processing.

(ii) Inter-Tier Migration Processing

Figure 11:
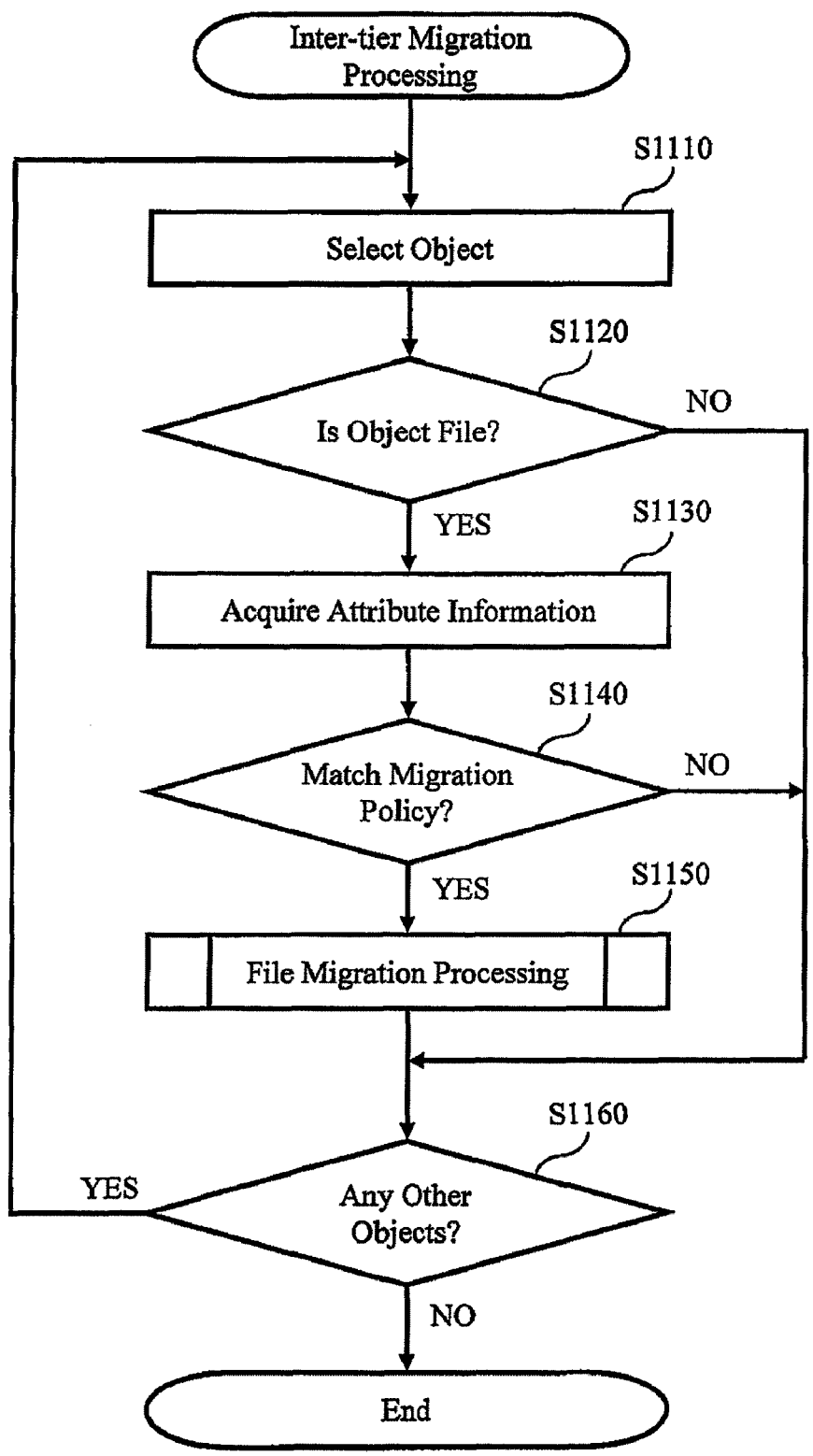
FIG. 11 shows exemplary processing of an inter-tier migration module in accordance with the first embodiment.

FIG. 11 is an exemplary flow chart for describing the details of the inter-tier migration processing executed by the inter-tier migration module 540 (in conjunction with the CPU 210). The inter-tier migration module 540 is executed in accordance with administrator's instructions or a prespecified schedule (e.g., once a day). The inter-tier migration module 540 migrates files between file systems of different tier levels based on the conditions specified by the inter-tier migration policy 550 while walking through each object of the pseudo-file system 360.

First, the inter-tier migration module 540 selects an object from the object management table 800 and acquires its entry (S1110). The entry acquired herein is the target of the inter-tier migration processing.

Next, the inter-tier migration module 540 checks if the object selected in S1110 is a file (S1120). In this embodiment, inter-tier migration of an object is performed only when it is a file.

If the selected object is determined to be a file (if the answer to S1120 is YES), the inter-tier migration module 540 identifies the entity of the file based on the FSID 830 and the real FS object ID of the entry acquired in S1110, and acquires attribute information thereof (S1130).

Then, the inter-tier migration module 540 checks if the attribute information acquired in S1130 matches the inter-tier migration policy 550 (S1140).

Figure 12:
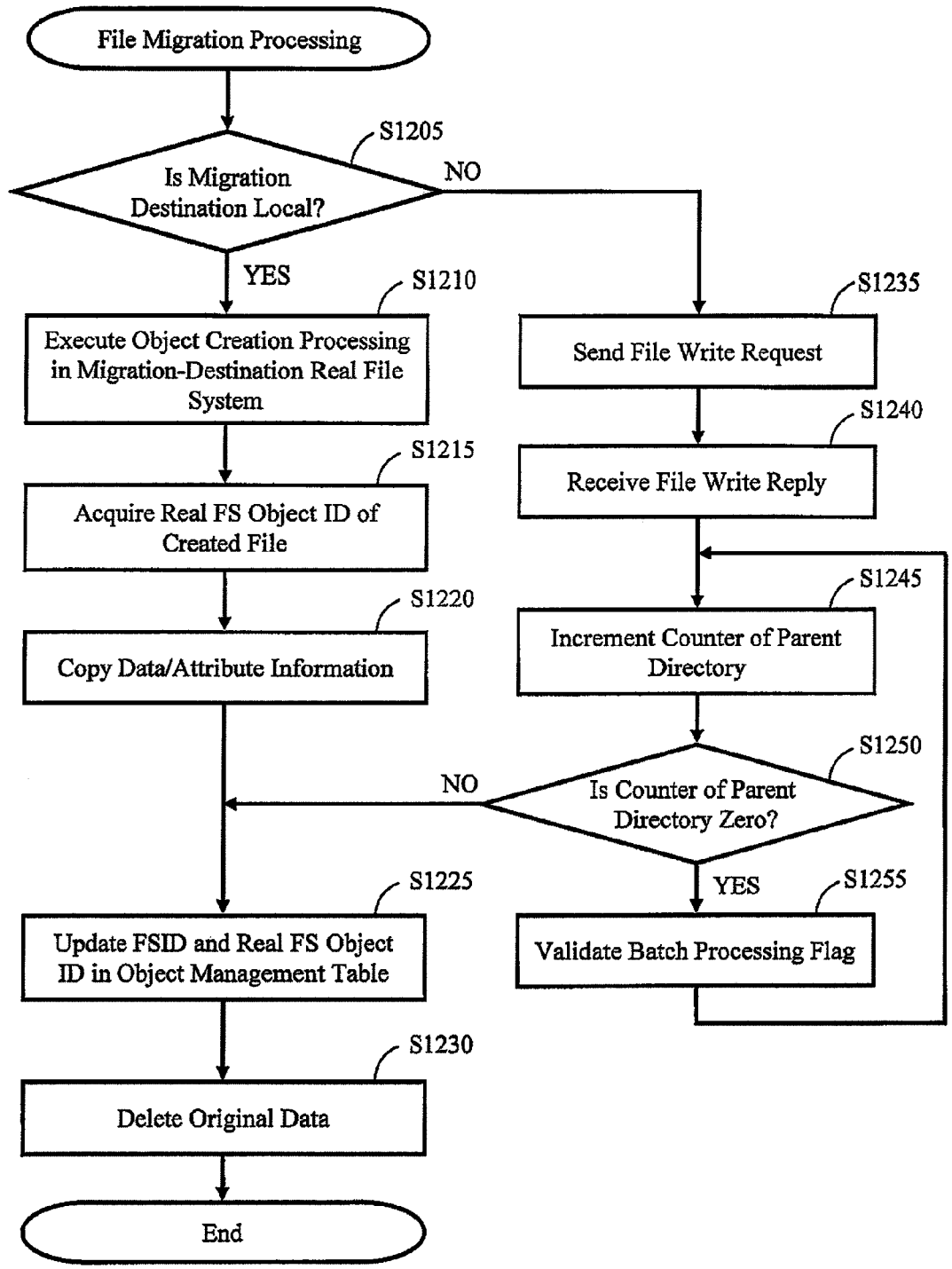
FIG. 12 shows exemplary file migration processing in accordance with the first embodiment.

If the acquired attribute information is determined to match the inter-tier migration policy 550 (if the answer to S1140 is YES), the inter-tier migration module 540 specifies the object name 810 of the migration target file, the real FS object ID 840, and the tier level 730 of the migration destination, and executes file migration processing (S1150) to migrate the file. In this embodiment, migration processing is performed only when the selected object is a file. Upon migration of the file to the migration destination of the specified tier level, the directory of the migrated file is created in the migration destination. However, such directory need not necessarily be created in the migration destination as long as the correspondence relationship between the directory in the migration source and the migration target file is managed. The details of the processing of migrating files to the migration destination will be described below (FIG. 12).

Then, the inter-tier migration module 540 checks for the presence of any other target objects, that is, if the object management table 800 contains objects that have not been selected yet (S1160).

If the presence of other target objects is determined (if the answer to S1160 is YES), the inter-tier migration module 540 again selects an object from the object management table 800 and acquires its entry (S1110).

If the absence of other target objects is determined (if the answer to S1160 is NO), the inter-tier migration module 540 ends the processing.

If the selected object is determined to be a directory (if the answer to S1120 is NO) and if the acquired attribute information is determined to not match the inter-tier migration policy 550 (if the answer to S1140 is NO), the inter-tier migration module 540 does not perform file migration processing and checks if there is another object to be selected (S1160).

(iii) Details of File Migration Processing (S1150)

FIG. 12 is an exemplary flow chart for describing the details of the file migration processing (S1150) of FIG. 11.

First, the inter-tier migration module 540 checks which of the local file system (e.g., the real file system B) and the file system on the cloud computing environment 400 (e.g., the real file system C) is the migration destination of the file (S1205). More specifically, the inter-tier migration module 540 searches the tier management table 700 to check if the connection destination information 740 of an entry corresponding to the migration destination of the tier level, which has been specified in execution of the file migration processing, is blank (e.g., NULL value). The connection destination information 740 being blank means that the file migration destination is the local file system, whereas the connection destination information 740 being not blank means that the file migration destination is the file system on the cloud computing environment 400.

If the connection destination information is determined to be blank (if the answer to S1205 is YES), the inter-tier migration module 540 refers to the tier management table 700 to identify the real file system in the migration destination of the tier level 730, and executes object creation processing to the real file system (S1210). In this embodiment, if some directory is found to not exist in execution of the object creation processing, such directory is newly created so that the path of the original file is maintained. Assume, for example, that a file whose path is /DIR/FILE2 in the real file system A 370 is migrated to the real file system B 380. In such a case, if the directory of DIR does not exist, such directory is newly created before creating FILE 2.

Next, the inter-tier migration module 540 acquires the real FS object ID of the created object from the result of the object creation processing in S1210 (S1215).

Then, the inter-tier migration module 540 copies data and attribute information of the file with the real FS object ID, which has been specified in execution of the file migration processing, to the file with the real FS object ID acquired in S1215 (S1220).

If the connection destination information 740 is determined to be not blank, that is, if the migration destination is not local (if the answer to S1205 is NO), the inter-tier migration module 540 refers to the tier management table 700 to identify from the connection destination information 740 another file server 200 or the cloud computing environment 400 as a connection target, and then sends a file write request to the file server program 450 operated on such file server 200 or cloud computing environment 400 (S1235). When the protocol of the file server program 450 is WebDAV (Web-based Distributed Authoring and Versioning), for example, the file write request corresponds to a PUT request. The file write request includes the object name 810 and file entity of the relevant file. The file entity is acquired from the real file system using the real FS object ID 840 specified in execution of the file migration processing. It should be noted that if some directory is found to not exist in sending a file write request, such directory is newly created so that the path of the original file is maintained. Assume, for example, that a file whose path is /DIR/FILE3 in the real file system A 370 is migrated to the real file system C 490. In such a case, if the directory of DIR does not exist, such directory is newly created before sending a file create request to create FILE 3.

Next, the inter-tier migration module 540 receives a file write reply sent from the file server program 450 in the cloud computing environment 400 (S1240).

Next, the inter-tier migration module 540 searches the object management table 800 to decrement the counter 850 of an entry corresponding to the parent directory by one (S1245).

Then, the inter-tier migration module 540 checks if the counter 850 of the entry corresponding to the parent directory is zero (S1250).

If the counter 850 is determined to be zero (if the answer to S1250 is YES), it means that all files included in the parent directory have been migrated. Thus, the inter-tier migration module 540 validates the batch processing flag 860 of the entry corresponding to the parent directory (S1255), and further decrements the counter 850 of an entry corresponding to a parent directory of that parent directory by 1 (S1245). Then, upon detecting a directory whose counter 850 is not zero after recursively walking through parent directories (if the answer to S1250 is NO), the flow proceeds to the processing of S1225. More specifically, in migration of /DIR2/DIR3/FILE1, for example, after FILE1 is migrated (after the processing of S1205 through S1230 is executed), the inter-tier migration module 540 decrements the counter 850 of the directory /DIR2/DIR3 to which FILE1 was immediately subordinate. When the counter 850 has thus become zero, the inter-tier migration module 540 validates the batch processing flag. Then, it further decrements the counter of /DIR2. When the counter indicates not zero, the flow exits from the loop.

After the requested file is migrated through the processing of S1210 to S1220 or S1235 to S1255, the inter-tier migration module 540 updates the FSID 830 and the real FS object ID 840 in the object management table 800 (S1225), deletes the file that resides in the migration-source real file system of the tier level (S1230), and ends the processing.

It should be noted that the batch processing flag 860 validated in S1255 need not necessarily be validated according to the aforementioned conditions. For example, the file server 200 may be configured to periodically measure the latency of the network 130 (latency of communication between the file server 200 and the cloud computing environment 400), and if the measured latency has exceeded the threshold that has been set in advance by a system administrator, the inter-tier migration module 540 may check if the counter 850 of the parent directory is zero and validate, if it is determined to be zero, the batch processing flag 860. Alternatively, the system administrator may invalidate the batch processing flag 860 with the management terminal 110, taking into consideration the charge generated by the use of the resources of the cloud computing environment 400. As a further alternative, if a directory tree that has been migrated to the cloud computing environment 400 is so large that it would take a long time until the batch processing is completed, the system administrator may invalidate the batch processing flag 860 so that the index 295 can be immediately updated for the files for which the index creation processing has been completed. However, in such a case, the entire processing time becomes longer than when batch processing is performed.

(iv) Data Reading Processing

Figure 13:
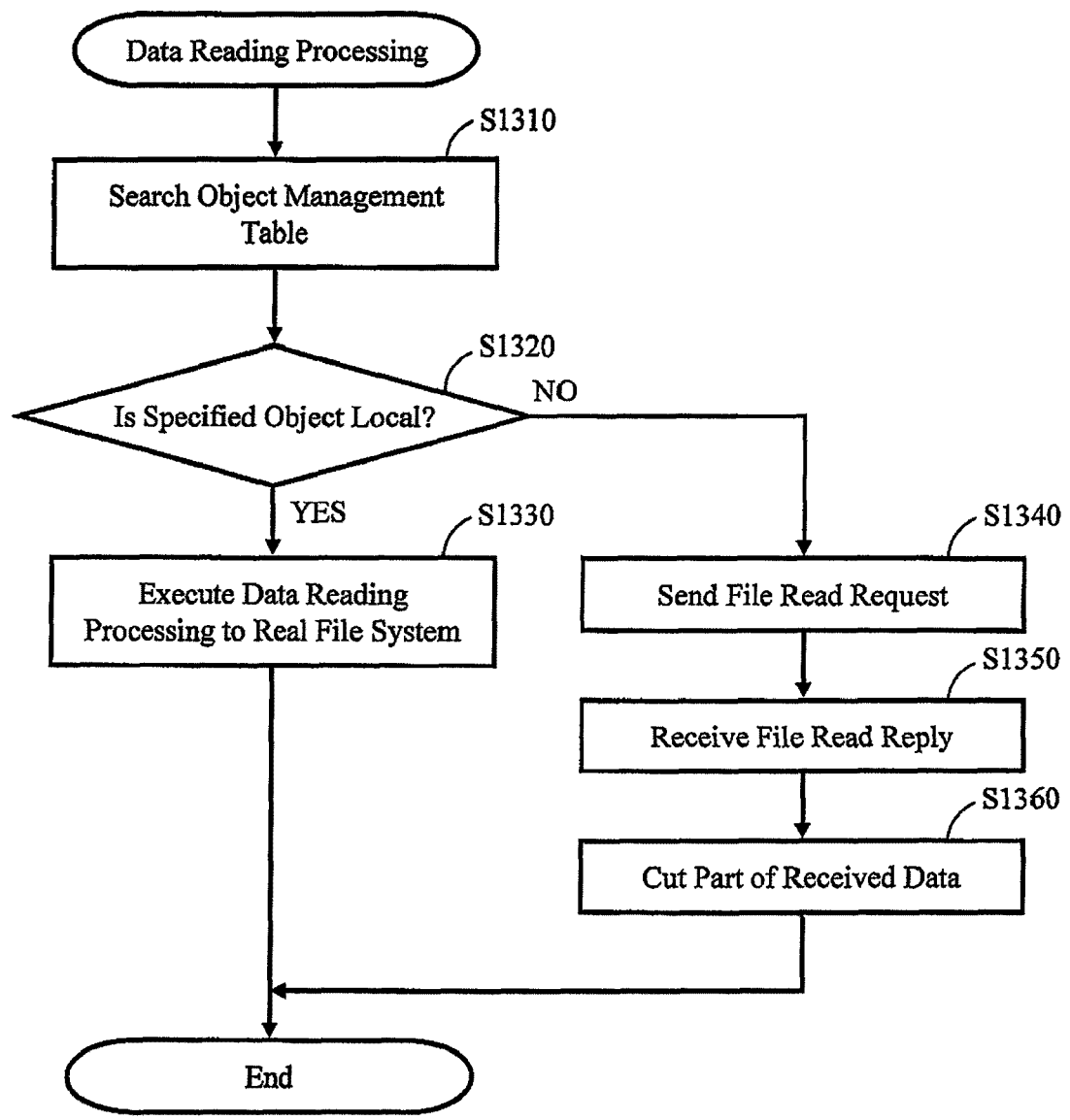
FIG. 13 shows exemplary processing of a data reading module in accordance with the first embodiment.

FIG. 13 is an exemplary flow chart for describing the details of the data reading processing executed by the data reading module 520 (in conjunction with the CPU 210). Upon receipt of a data read request by the file server program 260, the data reading module 520 executes read processing. The data read request corresponds to, when the file server program 260 is an NFS, a read request. The data read request includes the pseudo-FS object ID 820 of the file to be read and information on the range of the file to be read (offset).

First, the data reading module 520 searches the object management table 800 using the pseudo-FS object ID 820 (S1310) to check if the target file to be read is in the local file system or in the file system on the cloud computing environment 400 (S1320). Specifically, the data reading module 520 searches the tier management table 700 using the FSID 830 included in the entry of the object management table 800 to check if the connection destination information 740 is blank.

If the target file to be read is determined to be in the local file system (if the answer to S1320 is YES), the data reading module 520 executes data reading processing to the real file system using the real FS object ID corresponding to the pseudo-FS object ID 820 (S1330), and ends the processing. The result obtained by the data reading processing is returned to the client 100 via the file server program 260.

If the target file to be read is determined to be in the file system on the cloud (if the answer to S1320 is NO), the data reading module 520 refers to the tier management table 700 to identify from the connection destination information a file server or a cloud computing environment as a connection target, and then sends a file read request to the file server program 450 operated on such a file server or cloud computing environment 400 (S1340). The file read request corresponds to, when the protocol of the file server program 450 is WebDAV, for example, a GET request. The file read request includes the object name 810 of the relevant file.

Next, the data reading module 520 receives a file read reply sent from the file server program 450 (S1350).

Then, the data reading module 520 cuts only part of the data received in S1350 based on the range information included in the data read request received by the file server program 260 (S1360), and ends the processing. The cut result is returned to the client 100 via the file server program 260. It should be noted that the cutting processing in S1360 is the processing based on the assumption that a file read request sent to the file server program 450 cannot include information on the range of the file to be read and thus that data on the entire file is returned as a file read reply. When a file read request sent to the file server program 450 can include information on the range of the file to be read, the data reading module 520 does not perform the cutting processing such as the one in S1360. In such a case, the data received in S1350 is returned as it is to the client 100 via the file server program 260.

(v) Data Writing Processing

Figure 14:
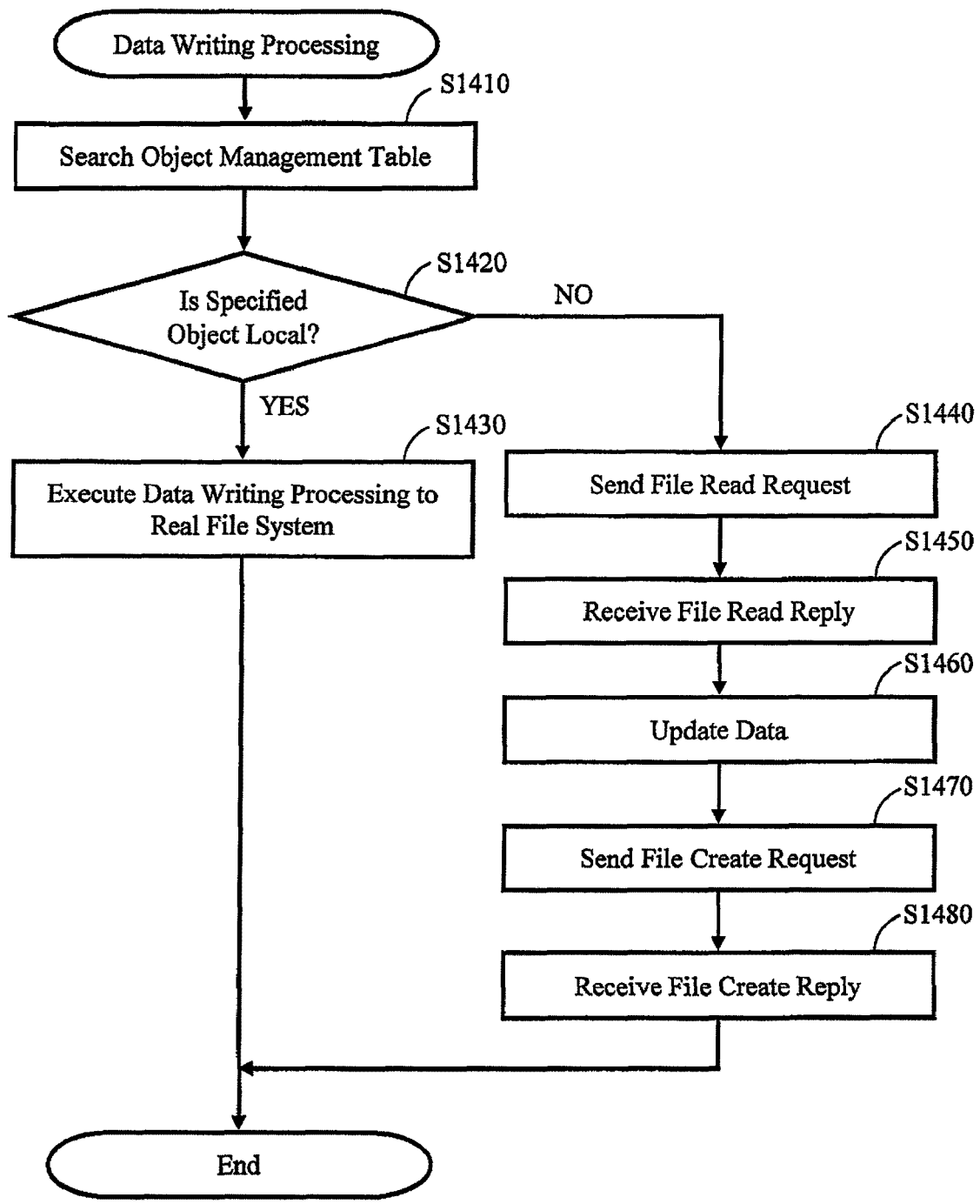
FIG. 14 shows exemplary processing of a data writing module in accordance with the first embodiment.

FIG. 14 is an exemplary flow chart for describing the details of the data writing processing executed by the data writing module 530 (in conjunction with the CPU 210). The data writing module 530 is executed upon receipt of a data write request by the file server program 260. The data write request corresponds to, when the file server program 260 is an NFS, a write request. The data write request includes the pseudo-FS object ID 820 of the file to be written, information on the range of the file to be written (offset), and data to be written.

First, the data writing module 530 searches the object management table 800 using the pseudo-FS object ID 820 (S1410) to check if the target file to be written is in the local file system or in the file system on the cloud computing environment 400 (S1420). Specifically, the data writing module 530 searches the tier management table 700 using the FSID 830 included in the entry of the object management table 800 to check if the connection destination information 740 is blank.

If the target file to be written is determined to be in the local file system (if the answer to S1420 is YES), the data writing module 530 executes data writing processing to the real file system using the real FS object ID corresponding to the pseudo-FS object ID 820 (S1430), and ends the processing. The result obtained by the data writing processing is returned to the client 100 via the file server program 260.

If the target file to be written is determined to be in the file system on the cloud (if the answer to S1420 is NO), the data writing module 530 refers to the tier management table 700 to identify from the connection destination information a file server or a cloud computing environment as a connection target, and then sends a file read request to the file server program 450 operated on such a file server or cloud computing environment 400 (S1440). Such processing is based on the assumption that a file read request sent herein cannot include information on the range of the file to be read and thus that data on the entire file is returned as a file read reply.

Next, the data writing module 530 receives a file read reply sent from the file server program 450 (S1450).

Next, the data writing module 530 writes data to part of the file received in S1450 based on the range information included in the data write request received by the file server program 260 (S1460).

Next, the data writing module 530 sends a file write request to the file server program 450 (S1470). The file write request corresponds to, when the protocol of the file server program 450 is WebDAV, for, example, a PUT request. The file write request includes the object name 810 and file entity of the relevant file. The file entity corresponds to a file, a desired portion of which has been updated in S1460.

Then, the data writing module 530 receives a file create reply sent from the file server program 450 (S1480), and ends the processing. The received result is returned to the client 100 via the file server program 260. The reason why the processing of S1440 through S1480 (which includes reading the entire file, updating data of the file, and writing the entire file) is that the file write request sent to the file server program 450 cannot include information on the range of the file to be written (i.e., data cannot be selectively written to a specific portion of a file). When a file write request sent to the file server program 450 can include information on the range of the file to be written, the data writing module 530 may directly update the file based on the range information included in the data write request received by the file server program 260.

(vi) Index Creation Processing

Figure 15:
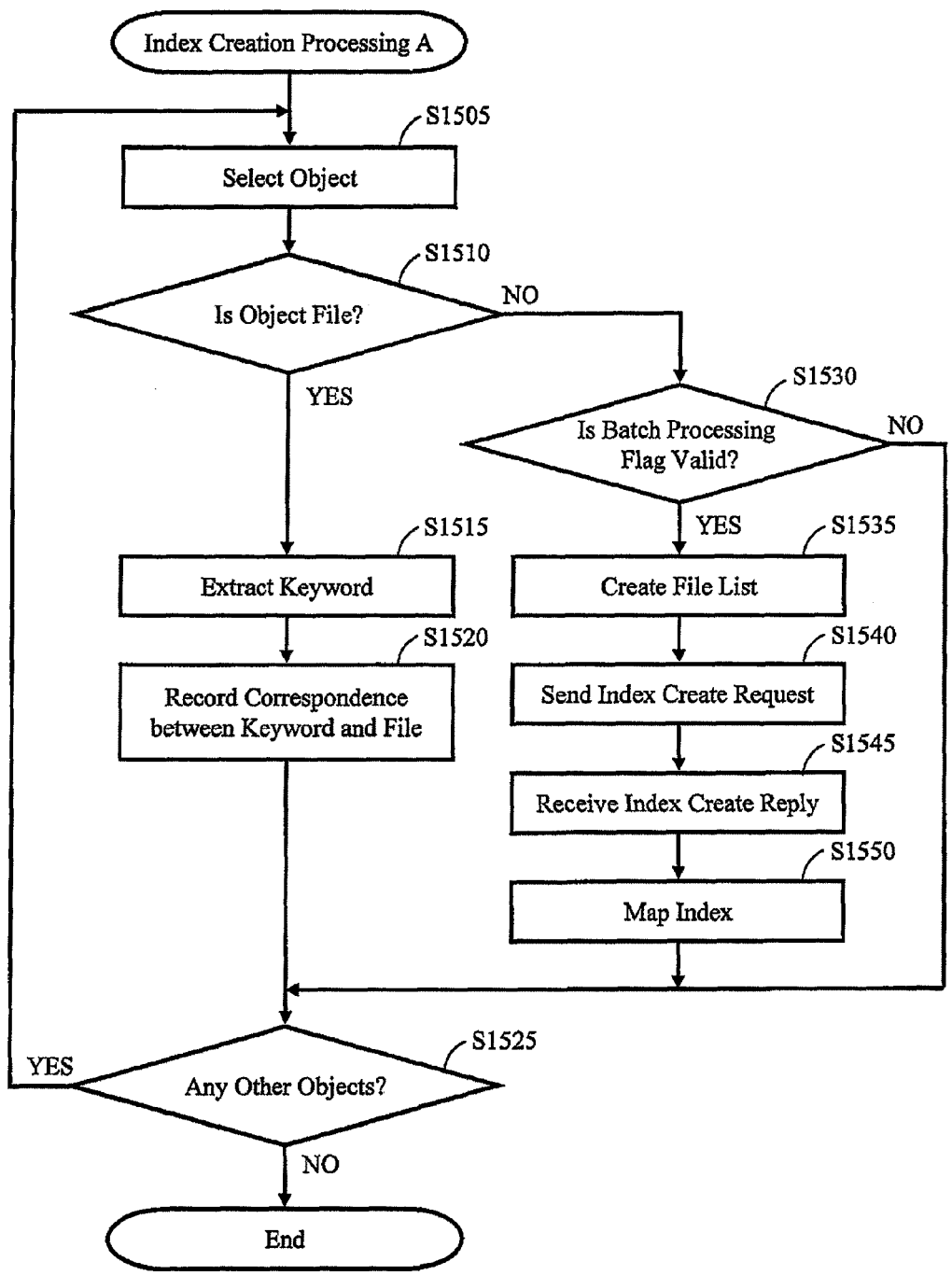
FIG. 15 shows exemplary processing of an index creation program A in accordance with the first embodiment.

FIG. 15 shows an exemplary flow chart for describing the details of the index creation processing executed by the index creation program A 290 (in conjunction with the CPU 210). The index creation program A 290 is executed when, for example, the "Execute" button 920 on the index creation screen 900 is pressed by a system administrator to create an index. When the index creation program A 290 is executed, information on the range of the object to be indexed (e.g., a target directory tree to be indexed) is specified by the system administrator.

First, the index creation program A 290 selects an object from the target directory tree to be indexed (S1505), and checks if the object is a file (S1510).

If the object is determined to be a file (if the answer to S1510 is YES), the index creation program A 290 reads data or metadata of the file and extracts a keyword (S1515).

Next, the index creation program A 290 records the correspondence relationship between the keyword extracted in S1515 and the relevant file on the index 295 (S1520). This correspondence relationship is a list including, for example, a pair of a given keyword and an identifier (e.g., the object name 810 or the pseudo-FS object ID 820) of a file in which the keyword appears. It should be noted that the index 295 can be retained either on the memory 250 or on one of the disk drives managed by the disk array system 300. Alternatively, the index 295 can be retained on other storage systems such as a DBMS (Data Base Management System).

Then, the index creation program A 290 checks for the presence of any other target objects to be indexed (S1525).

If the presence of other target objects to be indexed is determined (if the answer to S1525 is YES), the index creation program A 290 again selects an object from the target directory tree to be indexed (S1505).

If the absence of other target objects to be indexed is determined (if the answer to S1525 is NO), the index creation program A 290 ends the processing.

If the object is determined to be a directory (if the answer to S1510 is NO), the index creation program A 290 checks if the batch processing flag 860 of the directory is valid (S1530).

If the batch processing flag 860 is determined to be valid (if the answer to S1530 is YES), the index creation program A 290 creates a file list from all files under the directory (S1535).

Then, the index creation program A 290 sends an index create request to the index creation program B 460 (S1540). The index create request includes the list created in S1535 which contains the real FS objects IDs 840 of the target files to be indexed in the cloud computing environment 400.

The index creation program A 290 receives an index create reply sent from the index creation program B 460 (S1545). The index create reply includes temporary indexes for the files in the cloud computing environment 400 that have been created by the index creation program B 460. The processing of the index creation program B 460 that has received the index create request will be described below (see FIG. 16).

Next, the index creation program A 290 maps the temporary indexes included in the index create reply received in S1545 into the form of the index 295 (S1550), and then the flow proceeds to the processing of S1525. This mapping processing is the processing of, when the form of each temporary index is a pair of a keyword and the real FS object ID 840, for example, identifying the object name 810 and the pseudo-FS object ID 820 from the real FS object ID 840, replacing the real FS object ID 840 with them, and recording it on the index 295.

When the batch processing flag 860 is determined to be not valid (if the answer to S1530 is NO), the index creation program A 290 again selects an object from the target directory tree to be indexed (S1505). That is, objects under a directory whose batch processing flag 860 is not valid are iteratively indexed by normal processing, not by batch processing.

In this embodiment, the file server 200 uses the index creation program B 460 that has been preloaded in the memory 440 in the cloud computing environment 400. However, there are also cases in which files are migrated not only to the cloud computing environment 400 in which a given program can be loaded, but to other file servers 200 or other cloud computing environments 400 in which a given program cannot be loaded. In such cases, the index creation program A 290 may, when checking if the batch processing flag 860 is valid in S1530, also check the connection destination information 740. Specifically, batch indexing may be performed through the processing of S1535 to S1550 only when the batch processing flag 860 is valid and the connection destination information 740 includes information to the effect that a given program can be loaded, whereas iterative indexing may be performed in other cases through the processing of S1515 to S1520. For example, when two other file servers exist, one of which is a server with a computing environment in which programs can be loaded, and the other of which is a server without a computing environment in which programs can be loaded, it is possible to provide the connection destination information 740 in the tier management table 700 with a "program loadable flag" so that the flag for the former server is set valid whereas the flag for the latter server is set invalid. Thus, when checking if the batch processing flag 860 is valid, it is also possible to concurrently check the program loadable flag, so that if the program loadable flag is invalid, batch processing is not performed but individual processing is performed. Accordingly, it becomes possible to effectively merge a plurality of file servers and cloud computing environments with a variety of performance levels.

If a problem of a service fee charged for using the cloud computing environment 400 arises when the index creation program B 460 is always located on the memory 440 in the cloud computing environment 400, it is also possible to load such a program at the start of the index creation processing A and unload the program at the end of the index creation processing A. More specifically, when a program is executed in the cloud computing environment 400, load/unload (boot/stop) operations are typically performed per virtual machine (VM). In such a case, usage fee may be charged during the boot of the VM. In order to reduce such cost, the program may be loaded and unloaded at any given time (e.g., immediately after the start of the index creation processing A and immediately before the end of the index creation processing A) so that the time in which the program (the index creation processing program B) is located on the memory in the cloud computing environment 400 can be reduced.

Figure 16:
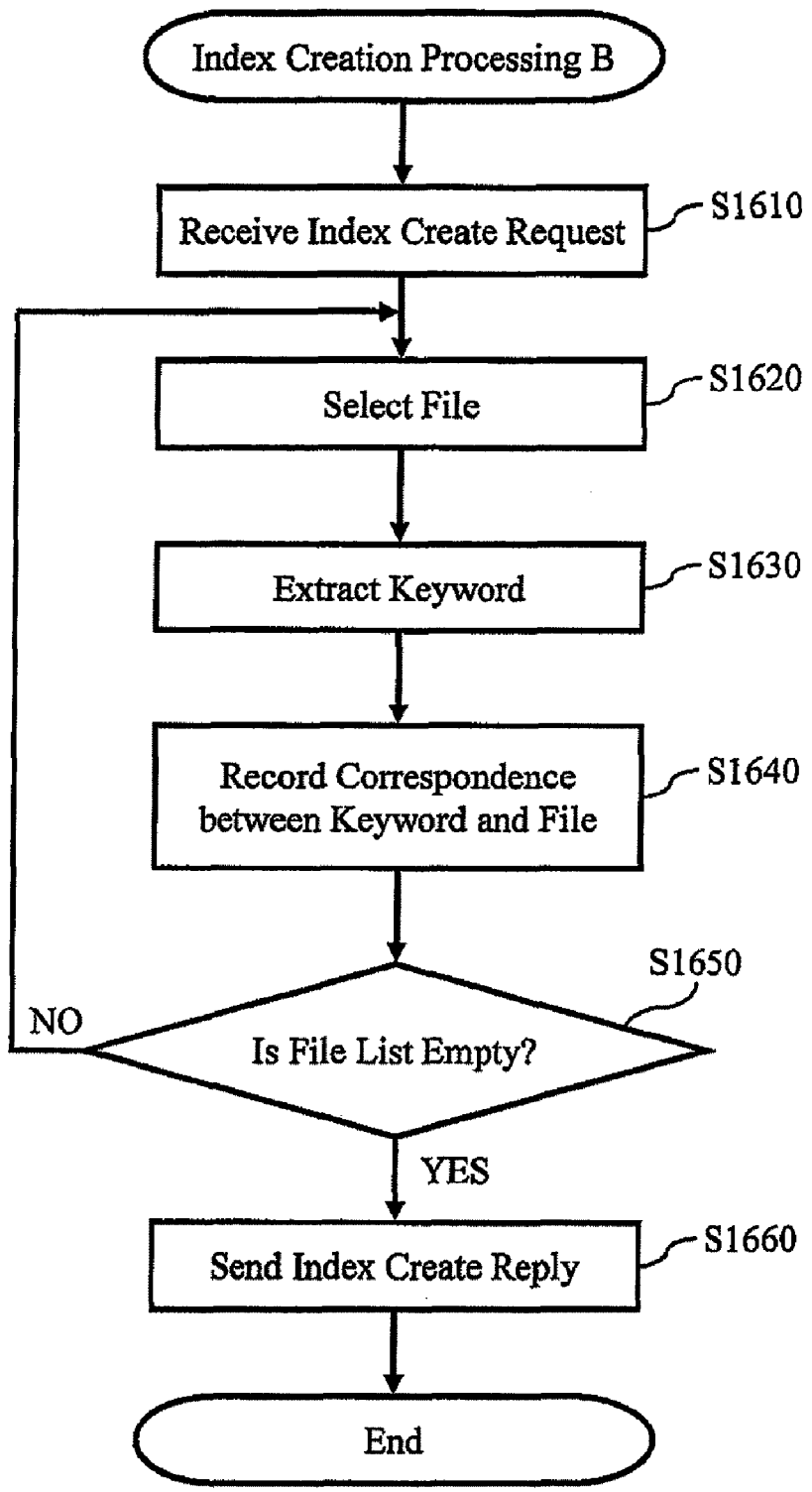
FIG. 16 shows exemplary processing of an index creation program B in accordance with the first embodiment.

FIG. 16 shows an exemplary flow chart for describing the details of the index creation processing executed by the index creation program B 460 (in conjunction with the CPU 410). The index creation program B 460 is executed upon receipt of an index create request from the file server 200 by the cloud computing environment 400. The index create request includes a list of the real FS object IDs 840 of the target files to be indexed.

First, the index creation program B 460 receives the index create request sent by the index creation program A 290 in S1540 (S1610).

The index creation program B 460 selects a file from the list of the target files to be indexed included in the index create request, and acquires the real FS object ID 840 of the file (S1620).

Then, the index creation program B 460 reads data or metadata of the file using the real FS object ID 840, and extracts a keyword (S1630). It should be noted that there are cases in which, when reading a file, the real file system C 490 cannot be accessed directly due to access restrictions set by the cloud computing environment 400 or depending on the form of the real FS object ID. In such cases, a file read request may be issued via the file server program 450 to read the target file.

Next, the index creation program B 460 records the correspondence relationship between the keyword extracted in S1630 and the relevant file on a temporary index (S1640). This correspondence relationship is a list including, for example, a pair of a given keyword and an identifier (e.g., the real FS object ID 840) of a file in which the keyword appears. It should be noted that the temporary index is temporarily retained on the memory 440 by the index creation program B 460.

Next, the index creation program B 460 checks if the list of the target files to be indexed is empty (S1650).

If the list of the target files to be indexed is determined to be empty (if the answer to S1650 is YES), the index creation program B 460 sends an index create reply to the index creation program A 290 (S1660), and ends the processing.

If the list of the target files to be indexed is determined to be not empty (if the answer to S1650 is NO), the index creation program B 460 again selects a file from the list of the target files to be indexed (S1620), and repeats such processing until all of the target files to be indexed are processed.

Through the aforementioned processing, index data (indexes to be used for the search engine program 280) on all of the files is created without omission.

(vii) Search Processing

Figure 17:
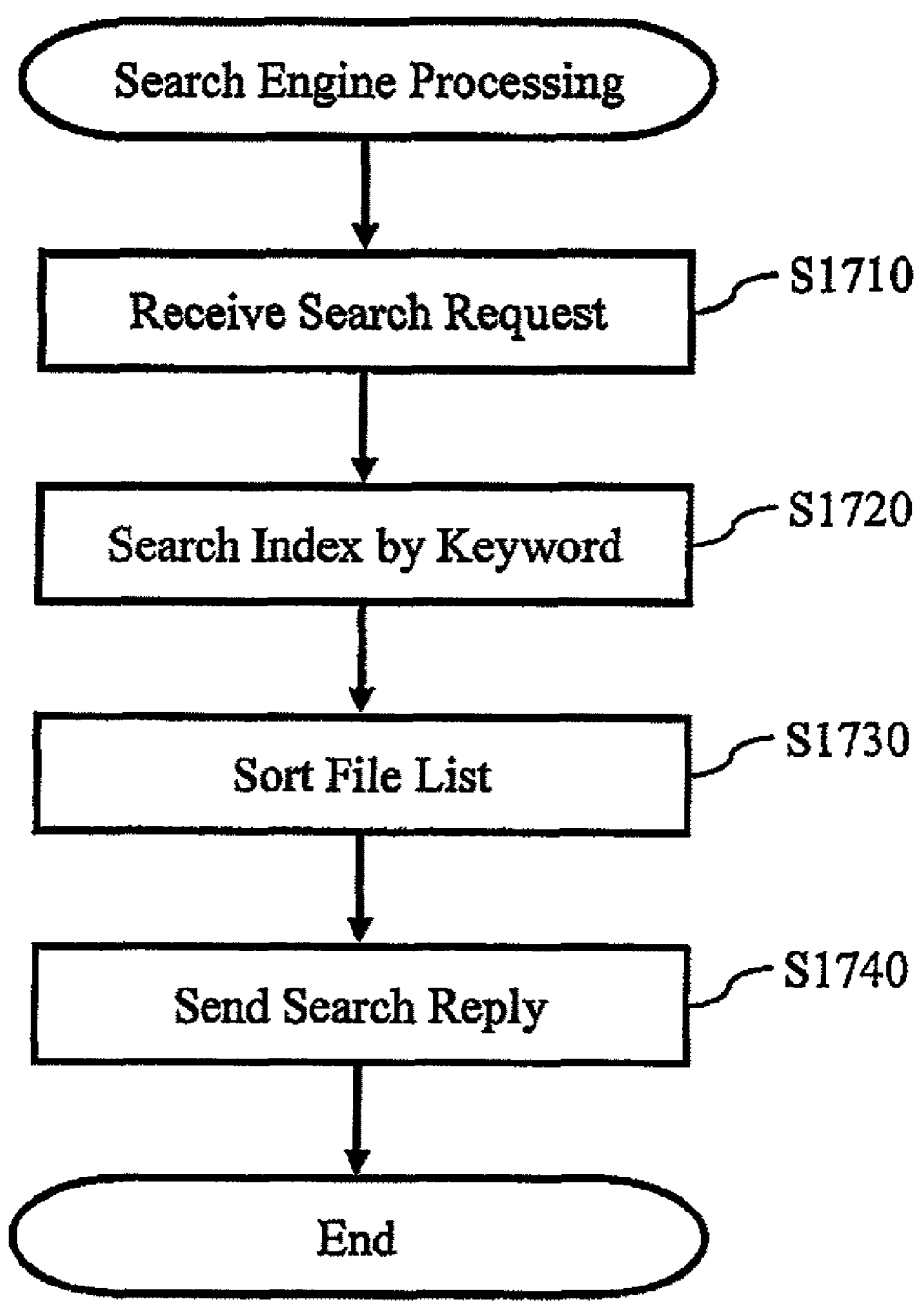
FIG. 17 shows exemplary processing of a search engine program in accordance with the first embodiment.

FIG. 17 is an exemplary flow chart for describing the details of the search processing executed by the search engine program 280 (in conjunction with the CPU 210). The search engine program 280 is executed upon receipt of a search request from a user (the client terminal 100) by the file server 200. The search request includes a keyword or a list of keywords.

First, the search engine program 280 receives a search request sent by, for example, a Web browser operating on the client 100 (S1710).

Then, the search engine program 280, with reference to the keyword or the list of keywords included in the search request, searches the index 295 to list identifiers (e.g., the object names 810 or the pseudo-FS object IDs 820) of files that contain the keyword specified by the user (S1720). If the search request includes a list of keywords, the search engine program 280 may list identifiers of files that contain all of such keywords. Further, a user may specify which of the aforementioned listing operations to be executed, and the search request may include such user's request.

Next, the search engine program 280 sorts the files listed in S1720 in order of decreasing value (based on the program's guess) for the user (e.g., sorting may be performed according to the appearance frequency of a keyword in files or the file update date and time, or performed by considering a plurality of parameters together: S1730).

Finally, the search engine program 280 converts the list of the identifiers of the files sorted in S1730 into a form that is more easily understandable by a user (e.g., a list of object names), sends a search reply to the Web browser on the client 100 (S1740), and ends the processing.

The aforementioned description is the processing of this embodiment. According to this embodiment, files that have been migrated to the cloud computing environment 400 can be collectively indexed by the index creation program B 460 located on the cloud computing environment 400. Thus, index creation processing for the pseudo-file system 360 provided by the file server 260 can be performed at fast speed.

Second Embodiment

Next, the second embodiment of the present invention will be described. Hereinafter, differences from the first embodiment will mainly be discussed. Points that are common to both the embodiments will be omitted or described briefly.

<Overview of Virus Check Processing>

Before the description of this embodiment, an overview (flow) of the virus check processing will be described.

First, upon completion of migration of all files under a given directory to the cloud computing environment, a flag, which indicates whether or not to collectively perform virus check processing on the cloud side, is validated for the metadata of the directory.

Next, a virus check program checks for viruses by scanning the entire directory tree. When the object to be scanned is a directory, the program checks if the batch processing is valid. If the batch processing is determined to be valid, the program issues a virus check request to another virus check program that has been preloaded in the cloud computing environment.

The virus check request includes a list of the identifiers of files under the target directory to be scanned.

Upon receipt of the request, the virus check program in the cloud computing environment checks for viruses in the target files, and sends the result to the virus check program on the file server.

Finally, the virus check program on the file server maps the obtained result into the name space of the file server so that all of the processing appears to a user as if it has been performed on the file server side.

Hereinafter, the second embodiment will be described in detail.

<Configurations of File Server and Cloud Computing Environment>

Figure 18:
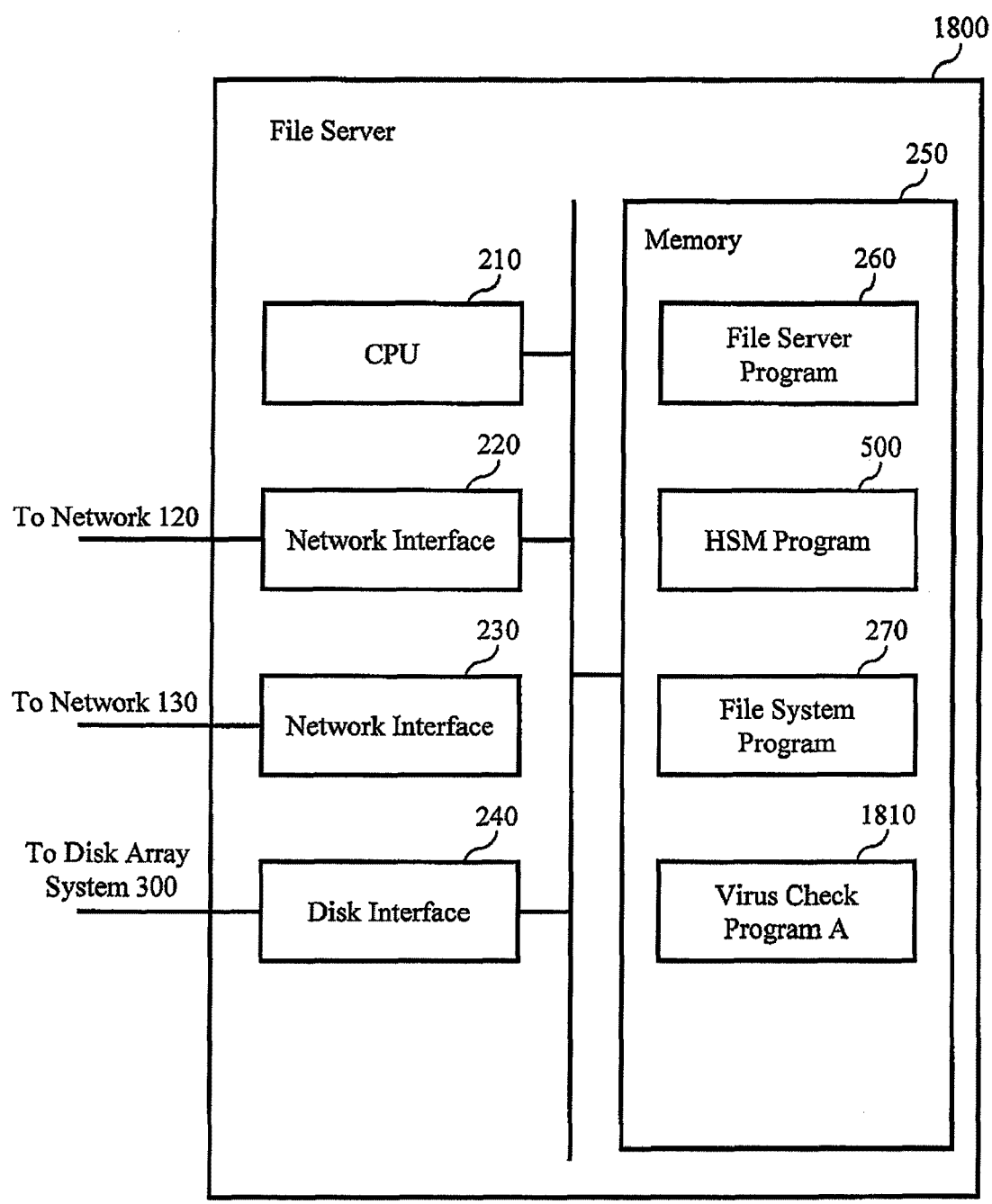
FIG. 18 shows the internal configuration of a file server in accordance with the second embodiment.

FIG. 18 is a block diagram showing the configuration of a file server in this embodiment. A file server 1800 in this embodiment includes a virus check program A 1810 instead of the search engine program 280, the index creation program A 290, and the index 295 of the file server 200 in FIG. 2.

The virus check program A 1810 is a program to check if files provided by the file server 200 are infected with computer viruses. The virus check program A 1810 operates in conjunction with a virus check program B 1910.

Figure 19:
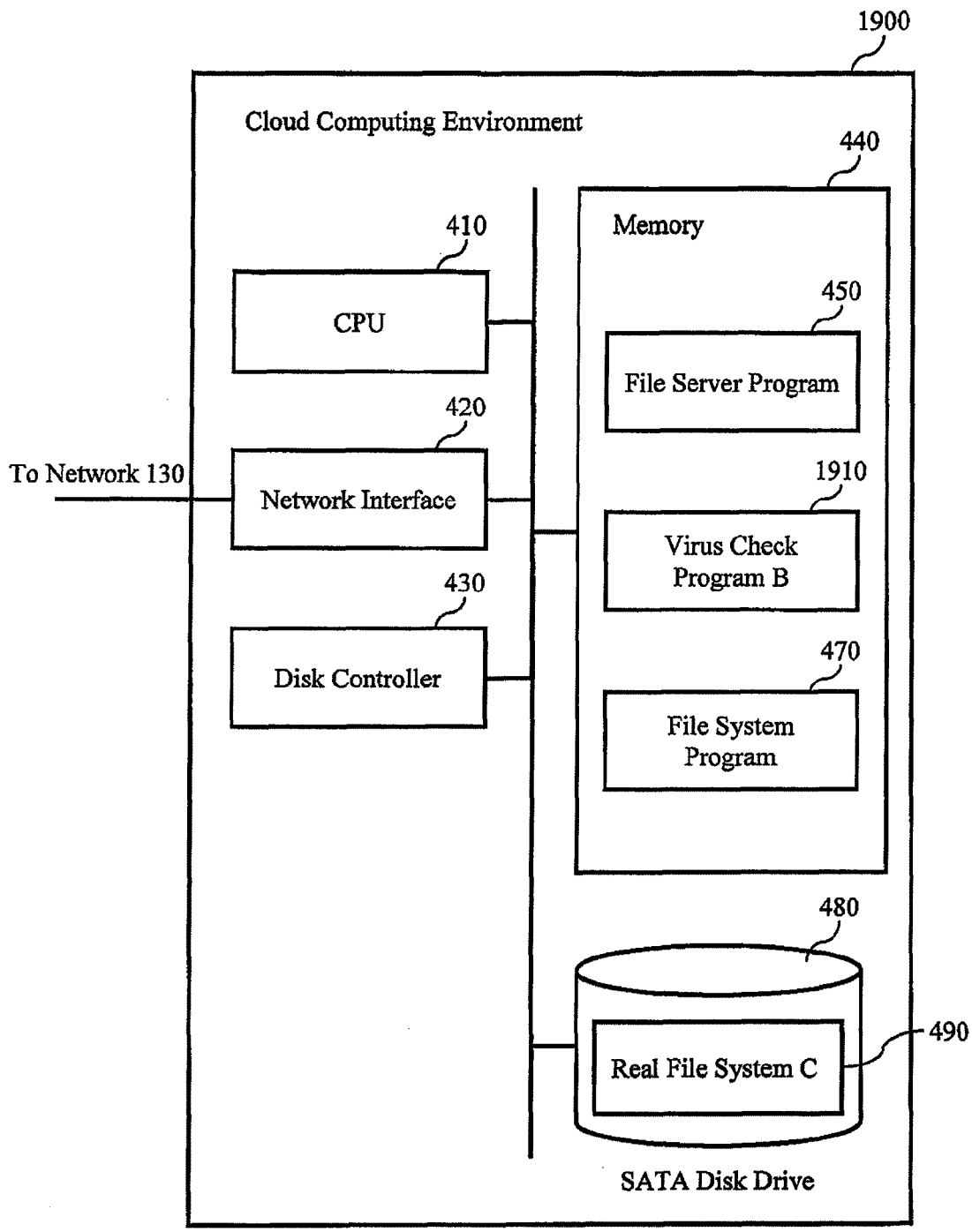
FIG. 19 shows the internal configuration of a cloud computing environment in accordance with the second embodiment.

FIG. 19 is a block diagram showing the configuration of a cloud computing environment in this embodiment. A cloud computing environment 1900 in this embodiment includes the virus check program B 1910 instead of the index creation program B 460 in the cloud computing environment 400.

The virus check program B 1910 is a program that operates in conjunction with the virus check program A 1810 to check for viruses in files on the cloud side.

<Virus Check Screen>

Figure 20:
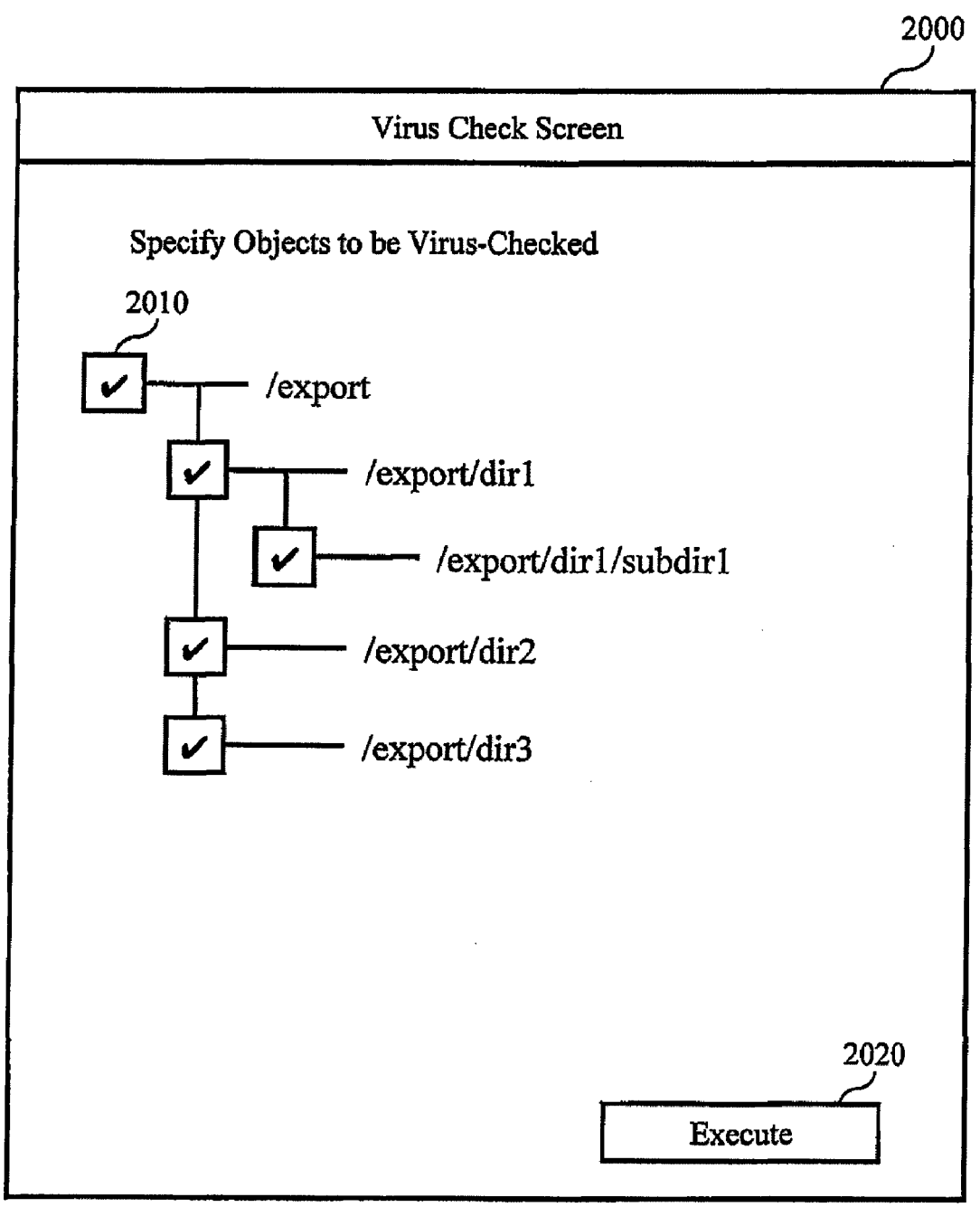
FIG. 20 shows an exemplary virus check screen in accordance with the second embodiment.

FIG. 20 is an exemplary virus check screen 2000 displayed on the management terminal 110 by the virus check program A 1810 in order for a system administrator to check for viruses.

The virus check screen 2000 includes a check box 2010 to non-exclusively select a target directory to be virus-checked and a button 2020 to execute virus check processing. In the check box 2010, a check mark is displayed when all directories under a given directory are selected, and a plus mark is displayed when part of directories under a given directory are selected. For example, in FIG. 20, all of the check boxes display check marks as all of the directories are selected.

<Virus Check Processing>

Hereinafter, virus check processing performed by the system in this embodiment will be described with reference to FIGS. 21 and 22.

Figure 21:
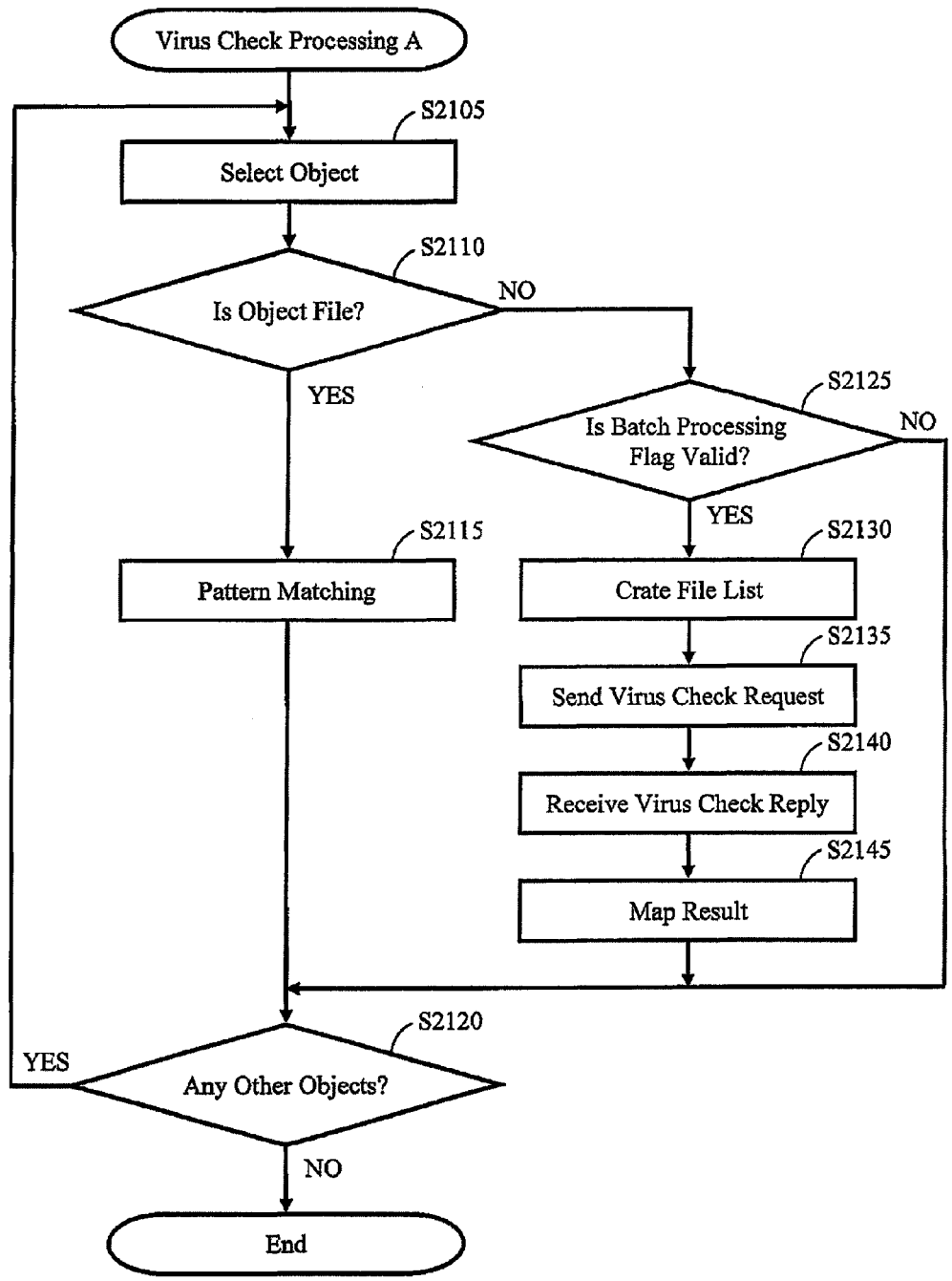
FIG. 21 shows exemplary processing of a virus check program A in accordance with the second embodiment.

FIG. 21 is an exemplary flow chart for describing the details of the virus check processing executed by the virus check program A 1810 (in conjunction with the CPU 210). The virus check program A 1810 is executed when, for example, the "Execute" button 2020 on the virus check screen 2000 is pressed by a system administrator to check for viruses. When the virus check program A 1810 is executed, information on the range of the object to be virus-checked (e.g., a target directory tree to be virus-checked) is specified by the system administrator.

First, the virus check program A 1810 selects an object from the target directory tree to be virus-checked (S2105), and checks if the object is a file (S2110).

If the object is determined to be a file (if the answer to S2110 is YES), the virus check program A 1810 reads data of the file and performs pattern matching between the file data and a virus pattern (S2115). If any file data that matches the virus pattern is found, the virus check program A 1810 retains the identifier (e.g., the object name 810 or the pseudo-FS object ID 820) of the file as a result.

Then, the virus check program A 1810 checks for the presence of any other target objects to be virus-checked (S2120).

If the presence of other target objects to be virus-checked is determined (if the answer to S2120 is YES), the virus check program A 1810 again selects an object from the target directory tree to be virus-checked (S2105).

If the absence of other target objects to be virus-checked is determined (if the answer to S2110 is NO), the virus check program A 1810 converts the result of S2115 into a form that is easily understandable by a user (e.g., a list of object names), displays it on the virus check screen 2000, and ends the program.

Meanwhile, if the object is determined to be a directory (if the answer to S2110 is NO), the virus check program A 1810 checks if the batch processing flag 860 of the directory is valid (S2125).

If the batch processing flag 860 is determined to be valid (if the answer to S2125 is YES), the virus check program A 1810 creates a file list from all files under the directory (S2130).

Next, the virus check program A 1810 sends a virus check request to the virus check program B 1910 (S2135). The virus check request includes a list of the real FS object IDs 840 of the target files to be virus-checked in the cloud computing environment 1900 that has been created in S2130.

Then, the virus check program A 1810 receives a virus check reply sent from the virus check program B 1910 (S2140). The virus check reply includes a temporary result that has been created by the virus check program B 1910 by checking for viruses in the files in the cloud computing environment 1900. The processing of the virus check program B 1910 that has received the virus check request will be described below (see FIG. 22).

Then, the virus check program A 1810 maps the temporary result included in the virus check reply received in S2140 into the same form as the form of the result created in S2125 (S2145), and then the flow proceeds to the processing of S2120. This mapping processing is the processing of, when the form of the temporary result is the real FS object ID 840 of the virus-infected file, for example, identifying the object name 810 and the pseudo-FS object ID 820 from the real FS object ID 840, replacing the real FS object ID 840 with them, and merging them with the result created in S2125.

Meanwhile, if the batch processing flag 860 is determined to be not valid (if the answer to S2125 is NO) and if there remain other objects to be virus-checked (if the answer to S2120 is YES), the virus check program A 1810 again selects an object from the target directory tree to be virus-checked (S2105). That is, objects under a directory whose batch processing flag 860 is not valid are iteratively virus-checked by normal processing, not by batch processing.

Figure 22:
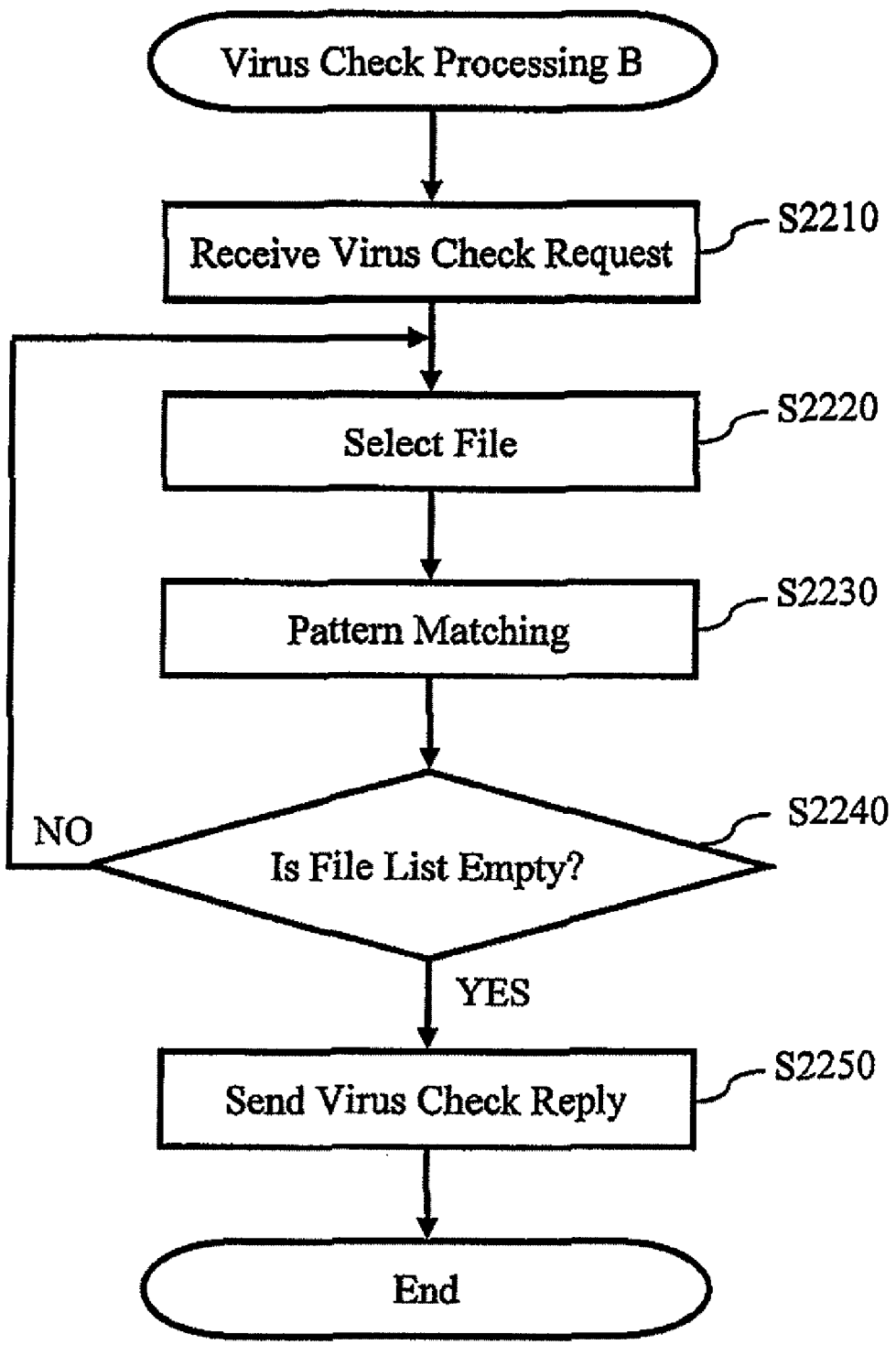
FIG. 22 shows exemplary processing of a virus check program B in accordance with the second embodiment.

FIG. 22 is an exemplary flow chart for describing the details of the virus check processing executed by the virus check program B 1910 (in conjunction with the CPU 410). The virus check program B 1910 is executed upon receipt of a virus check request from the file server 1800 by the cloud computing environment 1900. The virus check request includes a list of the real FS object IDs 840 of the target files to be virus-checked.

First, the virus check program B 1910 receives a virus check request sent by the virus check program A 1810 (S2210).

Then, the virus check program B 1910 selects one file from the list of the target files to be virus-checked included in the virus check request, and acquires the real FS object ID 840 of the file (S2220).

Next, the virus check program B 1910 reads data of the file using the real FS object ID 840, and performs pattern matching between the file data and a virus pattern (S2230). If any file data that matches the virus pattern is found, the virus check program B 1910 retains the identifier (e.g., the real FS object ID 840) of the file as a temporary result.

Then, the virus check program B 1910 checks if the list of the target files to be virus-checked is empty (S2240).

If the list of the target files to be virus-checked is determined to be empty (if the answer to S2240 is YES), the virus check program B 1910 sends a virus check reply to the virus check program A 1810 (S2250), and ends the processing.

If the list of the target files to be virus-checked is determined to be not empty (if the answer to S2240 is NO), the virus check program B 1910 again selects one file from the list of the target files to be virus-checked (S2220), and repeats the processing until all of the target files to be virus-checked are processed.

As described above, according to the second embodiment, files that have been migrated to the cloud computing environment 1900 can be collectively virus-checked by the virus check program B 1910 located on the cloud computing environment 1900. Thus, virus check processing for the pseudo-file system 360 provided by the file server 1800 can be performed at fast speed.

Conclusions

According to the present invention, the pseudo-file system 360 is constructed by virtually merging the real file systems A 370 and B 380 in the disk array system 300 connected to the file server 200 (or 1800) and the real file system C 490 in the cloud computing environment 400. Files are provided to the client terminal 100 based on such a pseudo-file system 360. The file server 200 (or 1800), in accordance with the index creation program A 290 (or the virus check program A 1810), responds to an index create request (or a virus check request) for files included in the real file systems A to C issued by the management terminal 110, and executes index creation processing (or virus check processing) to files included in the real file systems A 370 and B 380, and sends, for files included in the real file system C 490 (e.g., files under a directory whose batch processing flag is ON as described below), an index create request (or a virus check request) to the cloud computing environment 400 (or 1900) to execute index creation processing (or virus check processing). The cloud computing environment 400 (or 1900), in response to the processing request received, executes index creation processing (or virus check processing) to the target files in accordance with the index creation program B 460 (or the virus check program B 1910), and sends the processing result to the file server 200 (or 1800). The file server 200 (or 1800) maps (merges) the processing result obtained with the index creation program A 290 (or the virus check program A 1810) and the processing result obtained with the index creation program B 460 (or the virus check program B 1910), and provides the result to the management terminal 110. Accordingly, the number of communications between the file server and the cloud computing environment can be reduced, and thus the network latency problem can be addressed. Thus, it becomes possible to reduce the processing time required for scanning all of the target files (contents) to be indexed, virus-checked, or the like. It should be noted that each of the file server and the cloud computing environment may have both an index creation program and a virus check program.

The pseudo-file system 360 constitutes a hierarchical file system with the upper-level real file systems A and B (A is at a higher level than B) and the lower-level real file system C 490 (see FIG. 6). The file server 200 (or 1800), in accordance with the inter-tier migration policy 550, performs inter-tier migration of files from the real file systems A 370 and B 380 to the real file system C 490 (with the inter-tier migration module 540). Accordingly, it is possible to effectively use the storage area of the expensive real file system A 370.

Further, the pseudo-file system 360 has the object management table 800 that manages the correspondence relationship between the object of the pseudo-file system and the storage location of the real file or directory, and the batch processing flag 860 indicating that all files included in a single directory have been migrated to the real file system C 490. In such a case, the file server 200 (or 1800), in accordance with the index creation program A 290 (or the virus check program A 1810), refers to the object management table 800 for a file or directory corresponding to the index create request (or the virus check request), and sends an index create request (or a virus check request) to the cloud computing environment 400 (or 1900) to execute scan processing to all files included in the directory whose batch processing flag 860 is ON. Then, the cloud computing environment 400 (or 1900), in response to the processing request received, executes index creation processing (or virus check processing) to the target files in accordance with the index creation program B 460 (or the virus check program B 1910), and sends the processing result to the file server 200 (or 1800). Meanwhile, files that are included in a directory whose batch processing flag 860 is OFF and are included in the real file system C 490 are processed not in the cloud computing environment 400 (or 1900) but in the file server 200 (or 1800). Accordingly, the number of communications between the file server 400 (or 1800) and the cloud computing environment 400 (or 1900) can surely be minimized, and thus the network latency problem can be improved.

It should be noted that the file server 200 (or 1800) may be configured to monitor the state of communication with the cloud computing environment 400 (or 1900) and to change, when the amount of network delay indicated by the communication state exceeds a threshold concerning the network delay and the batch processing flag 860 in the object management table 800 is OFF, the batch processing flag 860 to ON. Accordingly, it becomes possible to efficiently execute, even when the cloud computing environment 400 (or 1900) is not instructed to perform batch processing, processing in accordance with the communication state of the network at any time.

Further, the file server 200 (or 1800) may also be configured instruct the cloud computing environment 400 (or 1900) to load and unload the index creation program B 460 (or the virus check program B 1910) into/from the memory 440 at any given time. Accordingly, the time in which the program is located on the memory in the cloud computing environment 400 (or 1900) can be reduced, and the service fee can thus be reduced.

The file-sharing system may further include another file server that is connected to the file server 200 (or 1800) and provides a different file system. In that case, the file server 200 (or 1800) checks if the new file server has a processing program corresponding to the index creation program B (or the virus check program B), and determines, based on the check result, which of the index creation program A 290 (or the virus check program A 1810) and the new file server is to execute the processing of one or more objects provided by the new file system. Accordingly, it becomes possible to easily handle a situation in which, for example, a file-sharing system should be constructed using a file server with no computing environment.

It should be noted that the present invention can also be realized by a program code of software that implements the function of the embodiments. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the function of the aforementioned embodiments, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, a CD-R, a magnetic tape, a non-volatile memory card, ROM, or the like is used.

Further, based on an instruction of the program code, an OS (operating system) running on the computer or the like may perform some or all of actual processes, and the function of the aforementioned embodiments may be implemented by those processes. Furthermore, after the program code read from the storage medium is written to the memory in the computer, the CPU or the like of the computer may, based on the instruction of the program code, perform some or all of the actual processes, and the function of the aforementioned embodiments may be implemented by those processes.

Moreover, the program code of the software that implements the function of the embodiments may be distributed via a network, and thereby stored in storage means such as the hard disk or the memory in the system or the apparatus, or the storage medium such as a CD-RW or the CD-R, and at the point of use, the computer (or the CPU or the MPU) in the system or the apparatus may read the program code stored in the storage means or the storage medium and execute the program code.

REFERENCE SIGNS LIST

100 Client
110 Management Terminal
200, 1800 File Server
300 Disk Array System
400, 1900 Cloud Computing Environment
260 File Server Program
450 File Server Program
270 File System Program
470 File System Program
280 Search Engine Program
290 Index Creation Program A
460 Index Creation Program B
295 Index
360 Pseudo-File System
370 Real File System A
380 Real File System B
490 Real File System C
500 HSM Program
510 Object Creation Module
520 Data Reading Module
530 Data Writing Module
540 Inter-tier migration Module
550 Inter-tier migration Policy
600 File System Tree
700 Tier management table 800 Object Management Table

The invention claimed is:

1. A file-sharing system comprising:

a first file server (200, 1800) including a first scan processing section (290, 1810) configured to scan data included in a file to generate predetermined information, the first file server (200, 1800) being configured to provide a file to a client terminal (100) based on a virtual file system (360) that is generated by virtually merging a first file system (370, 380) and a second file system (490); and a second file server (400, 1900) including a second scan processing section (460, 1910) and the second file system (490), the second scan processing section (460, 1910) being configured to scan data included in a file to generate predetermined information, wherein:

the first scan processing section (290, 1810), in response to a first scan processing request for files included in the first and second file systems (370, 380, 490) issued by a management terminal (110), executes scan processing to the files included in the first file system (370, 380) based on the virtual file system (360), and sends a second scan processing request to the second file server (400, 1900) to execute scan processing to the files included in the second file system (490), the second scan processing section (400, 1910), in response to the second scan processing request received, executes scan processing to the files included in the second file system and sends the scan processing result to the first file server (200, 1800), the first file server (200, 1800) merges the scan processing result obtained with the first scan processing section (290, 1810) and the scan processing result obtained with the second scan processing section (460, 1910), and provides the merged result to the management terminal (110), the first file server is a file server (200, 1800) connected to the client terminal (100) and the management terminal (110) via a network (120), the second file server is a cloud computing environment (400, 1900) connected to the first file server (200, 1800) via a network (130), the first file system is an upper-level real file system (370, 380) provided by a disk array system (300) connected to the first file server (200, 1800), the second file system is a lower-level real file system (490) provided by the cloud computing environment (400, 1900), the virtual file system (360) constitutes a hierarchical file system with the upper-level real file system (370, 380) and the lower-level real file system (490), the first file server (200, 1800) further includes an object management table (800) that manages a correspondence relationship between the virtual file system (360) and a storage location of a real file or directory, and a batch processing flag (860) indicating that all files included in a single directory have been migrated to the lower-level real file system (490), and also includes an inter-tier migration processing section (540) configured to migrate a file from the upper-level real file system (370, 380) to the lower-level real file system (490) in accordance with the conditions described in an inter-tier migration policy (550) that is a policy for migrating files between file systems of different tier levels, the first scan processing section (290, 1810) refers to the object management table (800) for a file and a directory corresponding to the first scan processing request, and sends the second scan processing request to the second file server (400, 1900) to execute scan processing to all files included in a directory whose batch processing flag (860) is ON, and executes by itself scan processing to files that are included in a directory whose batch processing flag (860) is OFF and are included in the second file system (490), instead of instructing the second scan processing section (460, 1910) to execute scan processing to such files, and the second scan processing section (460, 1910), in response to the second scan processing request received, executes scan processing to the files included in the directory whose batch processing flag (860) is ON, and sends the scan processing result to the first file server (200, 1800).

2. A file-sharing system comprising:

a first file server (200, 1800) including a first scan processing section (290, 1810) configured to scan data included in a file to generate predetermined information, the first file server (200, 1800) being configured to provide a file to a client terminal (100) based on a virtual file system (360) that is generated by virtually merging a first file system (370, 380) and a second file system (490); and a second file server (400, 1900) including a second scan processing section (460, 1910) and the second file system (490), the second scan processing section (460, 1910) being configured to scan data included in a file to generate predetermined information, wherein:

the first scan processing section (290, 1810), in response to a first scan processing request for files included in the first and second file systems (370, 380, 490) issued by a management terminal (110), executes scan processing to the files included in the first file system (370, 380) based on the virtual file system (360), and sends a second scan processing request to the second file server (400, 1900) to execute scan processing to the files included in the second file system (490), the second scan processing section (400, 1910), in response to the second scan processing request received, executes scan processing to the files included in the second file system and sends the scan processing result to the first file server (200, 1800), the first file server (200, 1800) merges the scan processing result obtained with the first scan processing section (290, 1810) and the scan processing result obtained with the second scan processing section (460, 1910), and provides the merged result to the management terminal (110), the virtual file system (360) constitutes a hierarchical file system with the first file system (370, 380) defined as an upper-level file system and the second file system (490) defined as a lower-level file system, and the first file server (200, 1800) further includes a file migration processing section (540) configured to migrate a file from the first file system (370, 380) to the second file system (490) in accordance with a predetermined condition (550), the first file sever (200, 1800) further includes an object management table (800) that manages a correspondence relationship between the virtual file system (360) and a storage location of a real file or directory, and a batch processing flag (860) indicating that all files included in a single directory have been migrated to the second file system (490), the first scan processing section (290, 1810) refers to the object management table (800) for a file and a directory corresponding to the first scan processing request, and sends the second scan processing request to the second file server (400, 1900) to execute scan processing to all files included in a directory whose batch processing flag (860) is ON, and the second scan processing section (460, 1910), in response to the second scan processing request received, executes scan processing to the files included in the directory whose batch processing flag is ON and sends the scan processing result to the first file server (200, 1800).

3. The file-sharing system according to claim 2, wherein the first scan processing section (290, 1810) executes by itself scan processing to files that are included in a directory whose batch processing flag (860) is OFF and are included in the second file system (490), instead of instructing the second scan processing section (460, 1910) to execute scan processing to such files.

4. The file-sharing system according to claim 2, wherein:
the first and second scan processing sections (290, 460, 1810, 1910) are implemented as programs loaded in memory, and
the first file server (200, 1800) instructs the second file server (400, 1900) to load and unload the program for implementing the second scan processing section (460, 1910) into/from memory (440) on the second file server (400, 1900) at any given time.

5. The file-sharing system according to claim 2, wherein:
the first file sever (200, 1800) monitors a state of communication with the second file server (400, 1900), and changes, when an amount of network delay indicated by the communication state exceeds a threshold concerning the network delay and the batch processing flag (860) in the object management table (800) is OFF, the batch processing flag (860) to ON.

6. The file-sharing system according to claim 2, further comprising a third file server that is connected to the first file server (200, 1800) and provides a third file system, wherein the first file server (200, 1800) checks if the third file server includes a third scan processing section corresponding to the second scan processing section (460, 1910), and determines, based on the check result, which of the first scan processing section (290, 1810) of the first file server (200, 1800) and the third scan processing section is to execute scan processing to one or more objects provided by the third file system.

7. The file-sharing system according to claim 2, wherein the scan processing executed by the first and second scan processing sections (290, 460, 1810, 1910) is index creation processing for creating index information to be used for searches by extracting a keyword from a file, or virus check processing for checking for viruses by scanning a file.

8. A program for causing a plurality of computers that constitute a storage system or are connected to a storage system to function as the file-sharing system according to claim 2.

9. A method for processing files with a file-sharing system, the file-sharing system comprising a first file server (200, 1800) including a first file system (370, 380) and a second file server (400, 1900) including a second file system (490), wherein:
the first file server (200, 1800) generates a virtual file system (360) by merging the first file system (370, 380) and the second file system (490), and provides a file to a client terminal (100) based on the virtual file system (360),
the first file server (200, 1800), in response to a scan processing request for files included in the first and second file systems (370, 380, 490) issued by a management terminal (110), executes scan processing to the files included in the first file system (370, 380) based on the virtual file system (360) and sends a scan processing request to the second file server (400, 1900) to execute scan processing to the files included in the second file system (490),
the second file server (400, 1900), in response to the scan processing request received from the first file server (200, 1800), executes scan processing to the files included in the second file system and sends the scan processing result to the first file server (200, 1800),
the first file server (200, 1800) merges its own scan processing result and the scan processing result obtained from the second file server (400, 1900), and provides the merged result to the management terminal (110),
the first file server is a file server (200, 1800) connected to the client terminal (100) and the management terminal (110) via a network (120), the second file server is a cloud computing environment (400, 1900) connected to the first file server (200, 1800) via a network (130), the first file system is an upper-level real file system (370, 380) provided by a disk array system (300) connected to the first file server (200, 1800),
the second file system is a lower-level real file system (490) provided by the cloud computing environment (400, 1900),
the virtual file system (360) constitutes a hierarchical file system with the upper-level real file system (370, 380) and the lower-level real file system (490),
the first file server (200, 1800) performs the following processing:
executing inter-tier migration of a file from the upper-level real file system (370, 380) to the lower-level real file system (490) in accordance with conditions described in an inter-tier migration policy (550) that is a policy for migrating files between file systems of different tier levels including the upper- and lower-level real file systems (370, 380, 490),
updating, while executing the inter-hierarchical file migration, information of an object management table (800) that manages a correspondence relationship between the virtual file system (360) and a storage location of a real file or directory, and a batch processing flag (860) indicating that all files included in a single directory have been migrated to the lower-level real file system (490), and
referring to the object management table (800) for a file and a directory corresponding to the scan processing request, and sending a scan processing request to the second file server (400, 1900) to execute scan processing to all files included in a directory whose batch processing flag (860) is ON, and executing by itself scan processing to files that are included in a directory whose batch processing flag is OFF and are included in the second file system (490), instead of instructing the second scan processing section (460, 1910) to execute scan processing to such files, and
the cloud computing environment (400, 1900), in response to the scan processing request received from the first file server (200, 1800), executes scan processing to the files included in the directory whose batch processing flag is ON and sends the scan processing result to the first file server (200, 1800).

* * * * *